United States Patent
Roth et al.

(10) Patent No.: US 11,049,375 B2
(45) Date of Patent: Jun. 29, 2021

(54) PARCEL DELIVERY PREDICTION-BASED THEFT DETECTION

(71) Applicant: AMAZON TECHNOLOGIES, INC., Seattle, WA (US)

(72) Inventors: Joshua Roth, Pacific Palisades, CA (US); James Siminoff, Pacific Palisades, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/735,593

(22) Filed: Jan. 6, 2020

(65) Prior Publication Data
US 2020/0152030 A1 May 14, 2020

Related U.S. Application Data

(63) Continuation of application No. 15/992,702, filed on May 30, 2018, now Pat. No. 10,593,173.
(Continued)

(51) Int. Cl.
*G08B 13/196* (2006.01)
*G06Q 10/08* (2012.01)
(Continued)

(52) U.S. Cl.
CPC ... *G08B 13/19613* (2013.01); *G06K 9/00671* (2013.01); *G06K 9/00771* (2013.01); *G06Q 10/0833* (2013.01); *G08B 13/19628* (2013.01); *G08B 13/19669* (2013.01); *G08B 25/08* (2013.01); *G08B 15/00* (2013.01)

(58) Field of Classification Search
None
See application file for complete search history.

(56) References Cited

U.S. PATENT DOCUMENTS

| 4,764,953 A | 8/1988 | Chern et al. |
| 5,428,388 A | 6/1995 | Von Bauer et al. |

(Continued)

FOREIGN PATENT DOCUMENTS

| CN | 2585521 Y | 11/2003 |
| CN | 2792061 Y | 6/2006 |

(Continued)

OTHER PUBLICATIONS

PCT/US2018/035059 International Search Report and Written Opinion dated Aug. 27, 2018, 13 pages.

*Primary Examiner* — Thomas S McCormack
(74) *Attorney, Agent, or Firm* — Lathrop GPM LLP

(57) ABSTRACT

Techniques are disclosed to identify a previously-not-present stationary object within a sequence of image frames. A system determines a first frame of the plurality of image frames where an object is not within a field of view of the camera of the A/V device. The system then analyzes other frames to determine that the object becomes present and is stationary within the field of view of the camera. The system may identify a person approaching and moving away from the A/V device. The system may identify a stationary vehicle within and subsequently not within the field of view of the camera. The system may use identification of the parcel to generate a control signal that changes the operational mode of the A/V device to parcel protect mode.

17 Claims, 12 Drawing Sheets

Related U.S. Application Data

(60) Provisional application No. 62/513,300, filed on May 31, 2017.

(51) Int. Cl.
   *G06K 9/00* (2006.01)
   *G08B 25/08* (2006.01)
   *G08B 15/00* (2006.01)

(56) References Cited

U.S. PATENT DOCUMENTS

| | | |
|---|---|---|
| 5,760,848 A | 6/1998 | Cho |
| 6,072,402 A | 6/2000 | Kniffin et al. |
| 6,192,257 B1 | 2/2001 | Ray |
| 6,271,752 B1 | 8/2001 | Vaios |
| 6,356,196 B1 | 3/2002 | Wong et al. |
| 6,429,893 B1 | 8/2002 | Xin |
| 6,456,322 B1 | 9/2002 | Marinacci |
| 6,476,858 B1 | 11/2002 | Ramirez Diaz et al. |
| 6,633,231 B1 | 10/2003 | Okamoto et al. |
| 6,658,091 B1 | 12/2003 | Naidoo et al. |
| 6,753,774 B2 | 6/2004 | Pan et al. |
| 6,970,183 B1 | 11/2005 | Monroe |
| 7,062,291 B2 | 6/2006 | Ryley et al. |
| 7,065,196 B2 | 6/2006 | Lee |
| 7,085,361 B2 | 6/2006 | Lee |
| 7,109,860 B2 | 9/2006 | Wang |
| 7,193,644 B2 | 3/2007 | Carter |
| 7,222,081 B1 | 5/2007 | Sone |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0104730 A1 | 5/2005 | Yang |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2009/0141117 A1 | 6/2009 | Elberbaum |
| 2013/0057695 A1 | 3/2013 | Huisking |
| 2013/0188826 A1* | 7/2013 | Nishino ............... G06T 7/215 382/103 |
| 2015/0035987 A1 | 2/2015 | Fernandez |
| 2015/0120598 A1 | 4/2015 | Fadell et al. |
| 2015/0310381 A1 | 10/2015 | Lyman |
| 2016/0033966 A1 | 2/2016 | Farris et al. |
| 2016/0180667 A1* | 6/2016 | Bunker ............ G08B 13/19613 382/103 |

FOREIGN PATENT DOCUMENTS

| | | |
|---|---|---|
| EP | 0944883 B1 | 6/1998 |
| EP | 1480462 A1 | 11/2004 |
| GB | 2286283 A | 8/1995 |
| GB | 2354394 A | 3/2001 |
| GB | 2357387 A | 6/2001 |
| GB | 2400958 A | 10/2004 |
| JP | 2001-103463 A2 | 4/2001 |
| JP | 2002-033839 A2 | 1/2002 |
| JP | 2002-125059 A2 | 4/2002 |
| JP | 2002-342863 A2 | 11/2002 |
| JP | 2002-344640 A2 | 11/2002 |
| JP | 2002-354137 A2 | 12/2002 |
| JP | 2002-368890 A2 | 12/2002 |
| JP | 2003-283696 A2 | 10/2003 |
| JP | 2004-128835 A | 4/2004 |
| JP | 2005-341040 A | 12/2005 |
| JP | 2006-147650 A | 6/2006 |
| JP | 2006-262342 A | 9/2006 |
| JP | 09-008925 A | 1/2009 |
| WO | WO 199839894 A1 | 9/1998 |
| WO | WO 0113638 A1 | 2/2001 |
| WO | WO 200193220 A1 | 12/2001 |
| WO | WO 2002085019 A1 | 10/2002 |
| WO | WO 2003028375 A1 | 4/2003 |
| WO | WO 2003096696 A1 | 11/2003 |
| WO | WO 2006038760 A1 | 4/2006 |
| WO | WO 2006067782 A1 | 6/2006 |
| WO | WO 2007125143 A1 | 8/2007 |

\* cited by examiner ated with other locations, e.g., other stops on a delivery route with which the parcel is associated, may be used to take responsive action with respect to such other locations.

PARCEL DELIVERY PREDICTION-BASED THEFT DETECTION

CROSS REFERENCE TO OTHER APPLICATIONS

This application is a continuation of U.S. patent application Ser. No. 15/992,702, filed on May 30, 2018, which claims priority U.S. Provisional Patent Application No. 62/513,300, filed on May 31, 2017, the disclosures of which are incorporated herein by reference in their entireties.

TECHNICAL FIELD

The present disclosure relates to audio/video (A/V) recording and communication devices, including A/V recording and communication doorbell systems. In particular, the present embodiments relate to improvements in the functionality of A/V recording and communication devices that strengthen the ability of such devices to deter parcel theft and/or to identify and apprehend parcel thieves.

BACKGROUND

Home security is a concern for many homeowners and renters. Those seeking to protect or monitor their homes often wish to have video and audio communications with visitors, for example, those visiting an external door or entryway. Audio/Video (A/V) recording and communication devices, such as doorbells comprising A/V recording and communication devices, provide this functionality, and can also aid in crime detection and prevention. For example, audio and/or video captured by an A/V recording and communication device can be uploaded to the cloud and recorded on a remote server. Subsequent review of the A/V footage can aid law enforcement in capturing perpetrators of home burglaries and other crimes. Further, the presence of one or more A/V recording and communication devices on the exterior of a home, such as a doorbell unit at the entrance to the home, acts as a powerful deterrent against would-be burglars.

SUMMARY

One aspect of the present embodiments includes the realization that theft of parcels from porches and other parts of protected premises has proven to be a pervasive and pernicious problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. The present embodiments solve this problem by leveraging the functionality of A/V recording and communication devices to deter parcel theft and/or to identify and apprehend parcel thieves. In particular, in various embodiments, parcel delivery schedule information is used to predict the time at which a parcel will be delivered to a location at which a network-connected A/V recording and communication device is installed. The A/V recording and communication device may be placed in a "parcel protect" mode of operation based at least in part on the delivery time prediction. In the parcel protect mode, the A/V recording and communication device, and/or a backend server with which the A/V recording and communication device communicates, operate(s) to detect one or both of delivery of the parcel and removal of the parcel from the vicinity of the A/V recording and communication device. In various embodiments, data captured by the A/V recording and communication device may be processed to detect removal of the parcel and/or to determine whether such removal was authorized. If unauthorized removal of the parcel is detected, in some embodiments, delivery prediction information associated with other locations, e.g., other stops on a delivery route with which the parcel is associated, may be used to take responsive action with respect to such other locations.

In a first aspect, a system is provided, the system comprising a data storage device; and a processor operatively coupled to the data storage device and configured to: use delivery schedule information stored at the data storage device to determine a predicted delivery time at which a parcel is expected to be delivered to an associated delivery address; and cause an audio/video recording and communication device installed at the delivery address to operate in a parcel protect mode in which the audio/video recording and communication device is configured to be used to detect one or both of delivery of the parcel to the delivery address and removal of the parcel from the delivery address.

An embodiment of the first aspect further comprises a communication interface operatively coupled to the processor, wherein the processor is further configured to receive the delivery schedule information via the communication interface and to store the delivery schedule information at the data storage device.

In another embodiment of the first aspect, the audio/video recording and communication device is configured to detect motion within a field of view of the audio/video recording and communication device when the audio/video recording and communication device is in the parcel protect mode.

In another embodiment of the first aspect, the audio/video recording and communication device captures one or both of audio and video from within the field of view in response to detecting motion within the field of view.

In another embodiment of the first aspect, the processor is further configured to receive at least the video captured by the audio/video recording and communication device in response to detecting motion when in the parcel protect mode, and to process said video to determine whether the video depicts one or both of delivery of the parcel to and removal of the parcel from the field of view.

In another embodiment of the first aspect, the audio/video recording and communication device includes a sensor configured to detect presence of the parcel at the delivery address when the audio/video recording and communication device is in the parcel protect mode.

In another embodiment of the first aspect, the sensor includes one or more of the following: a radio frequency (RF) tag reader; a bar code, QR code, or other optical code reader; and a GPS receiver.

In another embodiment of the first aspect, the processor is further configured to receive sensor information from the sensor, determine based at least in part on the sensor information that the parcel has been removed from the delivery address, and take responsive action based at least in part on the determination that the parcel has been removed.

In another embodiment of the first aspect, the processor is further configured to receive an indication that the parcel has been removed from the delivery address by an unauthorized person and to determine in response to the indication and based at least in part on the delivery schedule information a video clip to be included in a set of video clips potentially associated with the unauthorized removal.

In another embodiment of the first aspect, the delivery address comprises a first delivery address; the parcel comprises a first parcel; the predicted delivery time comprises a first predicted delivery time; the audio/video recording and communication device comprises a first audio/video recording a communication device; and the processor is further configured to receive an indication that the first parcel has been removed from the first delivery address by an unauthorized person, determine in response to the indication and based at least in part on the delivery schedule information a second delivery address associated with a second parcel expected to be delivered to the second delivery address at a second predicted delivery time subsequent to the first delivery time, and take responsive action with respect to the second delivery address.

In another embodiment of the first aspect, the responsive action includes one or more of: notifying one or more of police, private security, and other public or private safety authorities; sending an alert to a user associated with the second audio/video recording and communication device; and causing the second audio/video recording and communication device to be placed in a heightened security mode.

In another embodiment of the first aspect, the delivery schedule information comprises one or more of an expected delivery time; a delivery route; a delivery schedule; a report of delivery completion; and GPS or other real time location information.

In another embodiment of the first aspect, the processor is further configured to detect removal of the parcel from the delivery address and to take a responsive action in response to detecting the removal of the parcel from the delivery address.

In another embodiment of the first aspect, the responsive action includes sending an alert to a user associated with one or both of the delivery address and the audio/video recording and communication device.

In a second aspect, a method is provided, the method comprising: using a processor to determine, based at least in part on delivery schedule information, a predicted delivery time at which a parcel is expected to be delivered to an associated delivery address; and causing an audio/video recording and communication device installed at the delivery address to operate in a parcel protect mode in which the audio/video recording and communication device is configured to be used to detect one or both of delivery of the parcel to the delivery address and removal of the parcel from the delivery address.

An embodiment of the second aspect further comprises receiving and storing the delivery schedule information.

In another embodiment of the second aspect, the audio/video recording and communication device is configured to capture one or both of audio and video from within the field of view in response to detecting motion within the field of view.

Another embodiment of the second aspect further comprises processing video received from the audio/video recording and communication device to determine whether the video depicts one or both of delivery of the parcel to and removal of the parcel from the field of view.

In another embodiment of the second aspect, the parcel comprises a first parcel, the delivery address comprises a first delivery address, the predicted deliver time comprises a first predicted delivery time, and further comprising receiving an indication that the first parcel has been removed from the first delivery address by an unauthorized person; determining in response to the indication and based at least in part on the delivery schedule information a second delivery address associated with a second parcel expected to be delivered to the second delivery address at a second predicted delivery time subsequent to the first delivery time; and taking responsive action with respect to the second delivery address.

In a third aspect, a computer program product embodied in a non-transitory computer-readable medium is provided, the computer program product comprising computer instructions for: determining, based at least in part on delivery schedule information, a predicted delivery time at which a parcel is expected to be delivered to an associated delivery address; and causing an audio/video recording and communication device installed at the delivery address to operate in a parcel protect mode in which the audio/video recording and communication device is configured to be used to detect one or both of delivery of the parcel to the delivery address and removal of the parcel from the delivery address.

BRIEF DESCRIPTION OF THE DRAWINGS

Various embodiments of the invention are disclosed in the following detailed description and the accompanying drawings.

DETAILED DESCRIPTION

Figure 1:
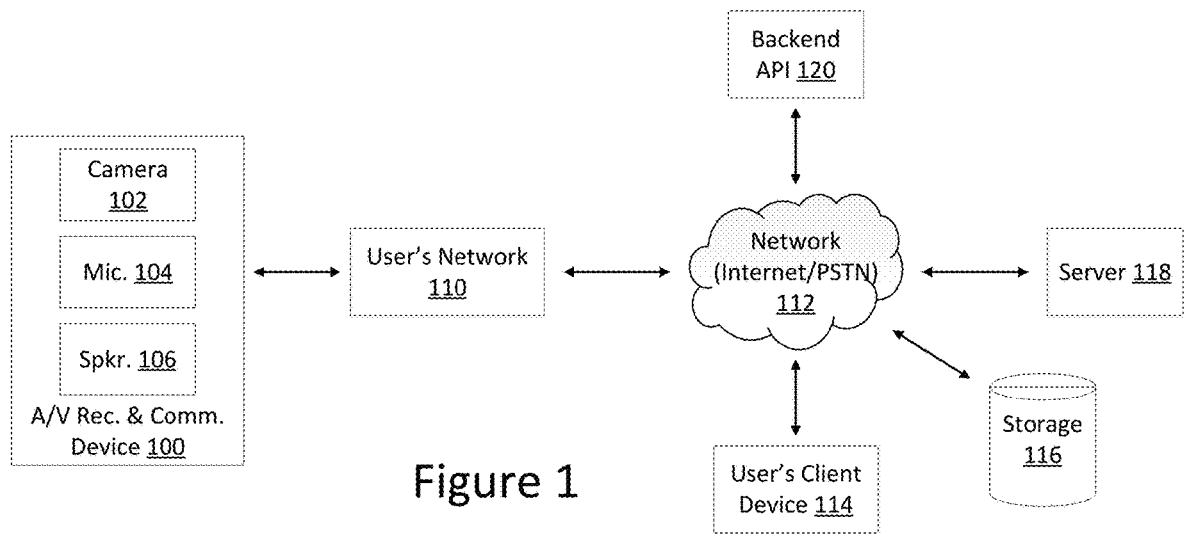
FIG. 1 is a functional block diagram illustrating a system for streaming and storing A/V content captured by an audio/video (A/V) recording and communication device according to various aspects of the present disclosure.

The present embodiments can be implemented in numerous ways, including as a process; an apparatus; a system; a computer program product embodied on a computer-readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the present embodiments. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments is provided below along with accompanying figures that illustrate the principles of the present embodiments. The present invention is described in connection with such embodiments, but the present invention is not limited to any embodiment. The scope of the present invention is limited only by the claims, and the present invention encompasses numerous alternatives, modifications, and equivalents. Numerous specific details are set forth in the following description in order to provide a thorough understanding of the present invention. These details are provided for the purpose of example, and the present invention may be practiced without some or all of these specific details.

The present disclosure describes several solutions to the problem of parcel theft, including parcel delivery prediction-based detection of parcel theft. In various embodiments, parcel delivery schedule information is used to predict the time at which a parcel will be delivered to a location at which a network-connected audio/video (A/V) recording and communication device is installed. The A/V recording and communication device may be placed in a "parcel protect" mode of operation based at least in part on the delivery time prediction. In the parcel protect mode, one or both of the A/V recording and communication device and a backend server, with which the A/V recording and communication device is configured to communicate, operate(s) to detect one or both of delivery of the parcel and removal of the parcel from the vicinity of the A/V recording and communication device. In various embodiments, data captured by the A/V recording and communication device may be processed to detect removal of the parcel and/or to determine whether such removal was authorized. If unauthorized removal of the parcel is detected, in some embodiments, delivery prediction information associated with other locations, e.g., other stops on a delivery route with which the parcel is associated, may be used to take responsive action with respect to such other locations.

With reference to FIG. 1, the present embodiments include an audio/video (A/V) device 100, such as a doorbell. While the present disclosure provides numerous examples of methods and systems including A/V recording and communication doorbells, the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the doorbells described herein, but without the front button and related components.

The A/V recording and communication device 100 is typically located near the entrance to a structure (not shown), such as a dwelling, a business, a storage facility, etc. The A/V recording and communication device 100 includes a camera 102, a microphone 104, and a speaker 106. The camera 102 may comprise, for example, a high definition (HD) video camera, such as one capable of capturing video images at an image display resolution of 1080p or better. While not shown, the A/V recording and communication device 100 may also include other hardware and/or components, such as a housing, one or more motion sensors (and/or other types of sensors), a button, etc. The A/V recording and communication device 100 may further include similar componentry and/or functionality as the wireless communication doorbells described in US Patent Application Publication Nos. 2015/0022620 (application Ser. No. 14/499,828) and 2015/0022618 (application Ser. No. 14/334,922), both of which are incorporated herein by reference in their entireties as if fully set forth.

With further reference to FIG. 1, the A/V recording and communication device 100 communicates with a user's network 110 user's network 110, which may be for example a wired and/or wireless network. If the user's network 110 is wireless, or includes a wireless component, the network 110 may be a Wi-Fi network compatible with the IEEE 802.11 standard and/or other wireless communication standard(s). The user's network 110 is connected to another network 112, which may comprise, for example, the Internet and/or a public switched telephone network (PSTN). As described below, the A/V recording and communication device 100 may communicate with the user's client device 114 via the user's network 110 and the network 112 (Internet/PSTN). The user's client device 114 may comprise, for example, a mobile telephone (may also be referred to as a cellular telephone), such as a smartphone, a personal digital assistant (PDA), or another communication device. The user's client device 114 comprises a display (not shown) and related components capable of displaying streaming and/or recorded video images. The user's client device 114 may also comprise a speaker and related components capable of broadcasting streaming and/or recorded audio, and may also comprise a microphone. The A/V recording and communication device 100 may also communicate with one or more remote storage device(s) 116 (may be referred to interchangeably as "cloud storage device(s)"), one or more servers 118, and/or a backend API (application programming interface) 120 via the user's network 110 and the network 112 (Internet/PSTN). While FIG. 1 illustrates the storage device 116, the server 118, and the backend API 120 as components separate from the network 112, it is to be understood that the storage device 116, the server 118, and/or the backend API 120 may be considered to be components of the network 112.

The network 112 may be any wireless network or any wired network, or a combination thereof, configured to operatively couple the above-mentioned modules, devices, and systems as shown in FIG. 1. For example, the network 112 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

According to one or more aspects of the present embodiments, when a person (may be referred to interchangeably as "visitor") arrives at the A/V recording and communication device 100, the A/V recording and communication device 100 detects the visitor's presence and begins capturing video images within a field of view of the camera 102. The A/V communication device 100 may also capture audio through the microphone 104. The A/V recording and communication device 100 may detect the visitor's presence using a motion sensor, and/or by detecting that the visitor has depressed the button on the A/V recording and communication device 100.

In response to the detection of the visitor, the A/V recording and communication device 100 sends an alert to the user's client device 114 (FIG. 1) via the user's network 110 and the network 112. The A/V recording and communication device 100 also sends streaming video, and may also send streaming audio, to the user's client device 114. If the user answers the alert, two-way audio communication may then occur between the visitor and the user through the A/V recording and communication device 100 and the user's client device 114. The user may view the visitor throughout the duration of the call, but the visitor cannot see the user (unless the A/V recording and communication device 100 includes a display, which it may in some embodiments).

The video images captured by the camera 102 of the A/V recording and communication device 100 (and the audio captured by the microphone 104) may be uploaded to the cloud and recorded on the remote storage device 116 (FIG. 1). In some embodiments, the video and/or audio may be recorded on the remote storage device 116 even if the user chooses to ignore the alert sent to his or her client device 114.

With further reference to FIG. 1, the system may further comprise a backend API 120 including one or more components. A backend API (application programming interface) may comprise, for example, a server (e.g. a real server, or a virtual machine, or a machine running in a cloud infrastructure as a service), or multiple servers networked together, exposing at least one API to client(s) accessing it. These servers may include components such as application servers (e.g. software servers), depending upon what other components are included, such as a caching layer, or database layers, or other components. A backend API may, for example, comprise many such applications, each of which communicate with one another using their public APIs. In some embodiments, the API backend may hold the bulk of the user data and offer the user management capabilities, leaving the clients to have very limited state.

The backend API 120 illustrated FIG. 1 may include one or more APIs. An API is a set of routines, protocols, and tools for building software and applications. An API expresses a software component in terms of its operations, inputs, outputs, and underlying types, defining functionalities that are independent of their respective implementations, which allows definitions and implementations to vary without compromising the interface. Advantageously, an API may provide a programmer with access to an application's functionality without the programmer needing to modify the application itself, or even understand how the application works. An API may be for a web-based system, an operating system, or a database system, and it provides facilities to develop applications for that system using a given programming language. In addition to accessing databases or computer hardware like hard disk drives or video cards, an API can ease the work of programming GUI components. For example, an API can facilitate integration of new features into existing applications (a so-called "plug-in API"). An API can also assist otherwise distinct applications with sharing data, which can help to integrate and enhance the functionalities of the applications.

The backend API 120 illustrated in FIG. 1 may further include one or more services (also referred to as network services). A network service is an application that provides data storage, manipulation, presentation, communication, and/or other capability. Network services are often implemented using a client-server architecture based on application-layer network protocols. Each service may be provided by a server component running on one or more computers (such as a dedicated server computer offering multiple services) and accessed via a network by client components running on other devices. However, the client and server components can both be run on the same machine. Clients and servers may have a user interface, and sometimes other hardware associated with them.

Figure 2:
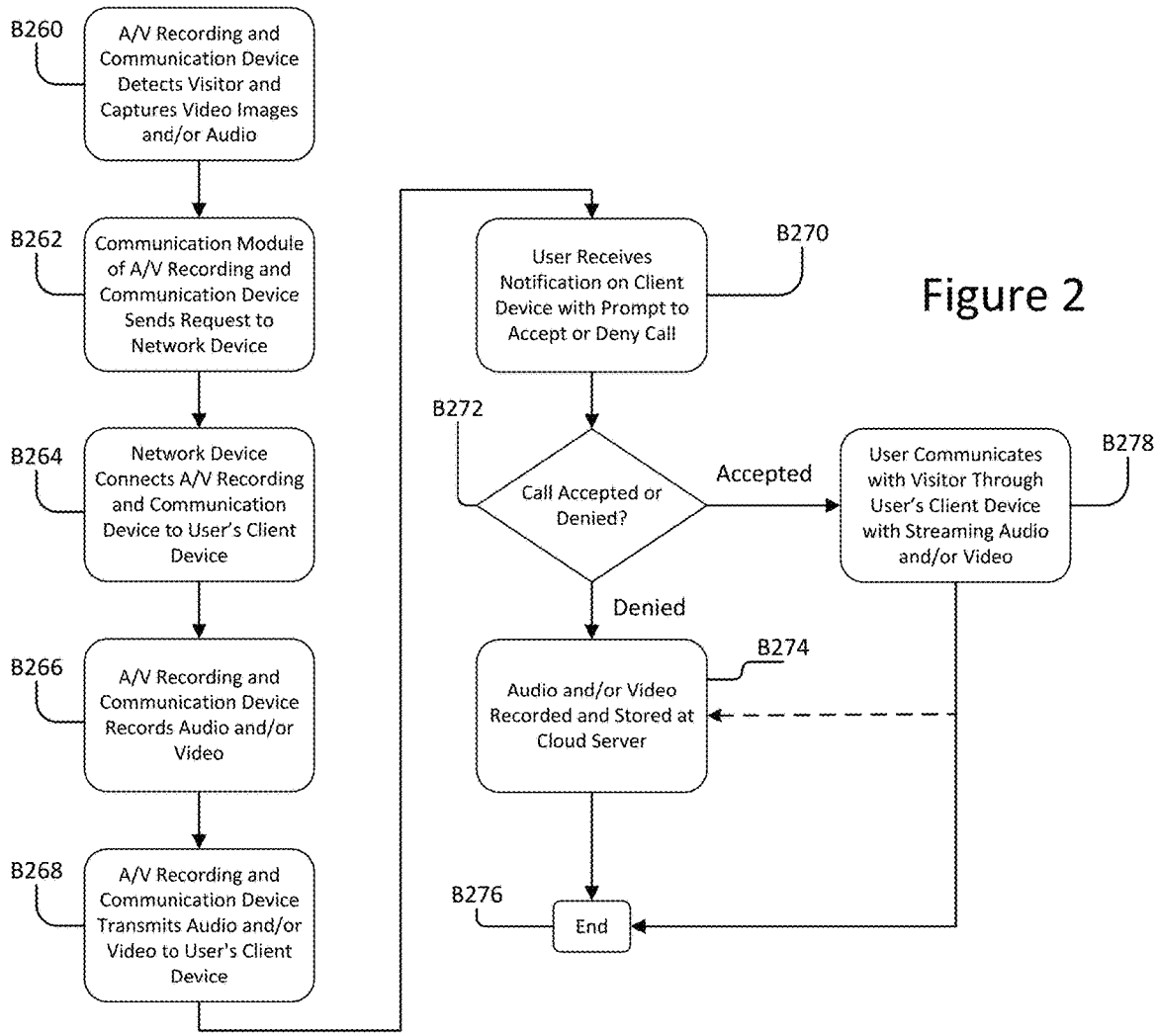
FIG. 2 is a flowchart illustrating a process for streaming and storing A/V content from an A/V recording and communication device according to various aspects of the present disclosure.

FIG. 2 is a flowchart illustrating a process for streaming and storing A/V content from the A/V recording and communication device 100 according to various aspects of the present disclosure. At block B260, the A/V recording and communication device 100 detects the visitor's presence and captures video images within a field of view of the camera 102. The A/V recording and communication device 100 may also capture audio through the microphone 104. As described above, the A/V recording and communication device 100 may detect the visitor's presence by detecting motion using the camera 102 and/or a motion sensor, and/or by detecting that the visitor has pressed a front button of the A/V recording and communication device 100 (if the A/V recording and communication device 100 is a doorbell). Also as described above, the video recording/capture may begin when the visitor is detected, or may begin earlier, as described below.

At block B262, a communication module of the A/V recording and communication device 100 sends a request, via the user's network 110 and the network 112, to a device in the network 112. For example, the network device to which the request is sent may be a server such as the server 118. The server 118 may comprise a computer program and/or a machine that waits for requests from other machines or software (clients) and responds to them. A server typically processes data. One purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes. In another example, the network device to which the request is sent may be an API such as the backend API 120, which is described above.

In response to the request, at block B264 the network device may connect the A/V recording and communication device 100 to the user's client device 114 through the user's network 110 and the network 112. At block B266, the A/V recording and communication device 100 may record available audio and/or video data using the camera 102, the microphone 104, and/or any other device/sensor available. At block B268, the audio and/or video data is transmitted (streamed) from the A/V recording and communication device 100 to the user's client device 114 via the user's network 110 and the network 112. At block B270, the user may receive a notification on his or her client device 114 with a prompt to either accept or deny the call.

At block B272, the process determines whether the user has accepted or denied the call. If the user denies the notification, then the process advances to block B274, where the audio and/or video data is recorded and stored at a cloud server. The session then ends at block B276 and the connection between the A/V recording and communication device 100 and the user's client device 114 is terminated. If, however, the user accepts the notification, then at block B278 the user communicates with the visitor through the user's client device 114 while audio and/or video data captured by the camera 102, the microphone 104, and/or other devices/sensors is streamed to the user's client device 114. At the end of the call, the user may terminate the connection between the user's client device 114 and the A/V recording and communication device 100 and the session ends at block B276. In some embodiments, the audio and/or video data may be recorded and stored at a cloud server (block B274) even if the user accepts the notification and communicates with the visitor through the user's client device 114.

Figure 3:
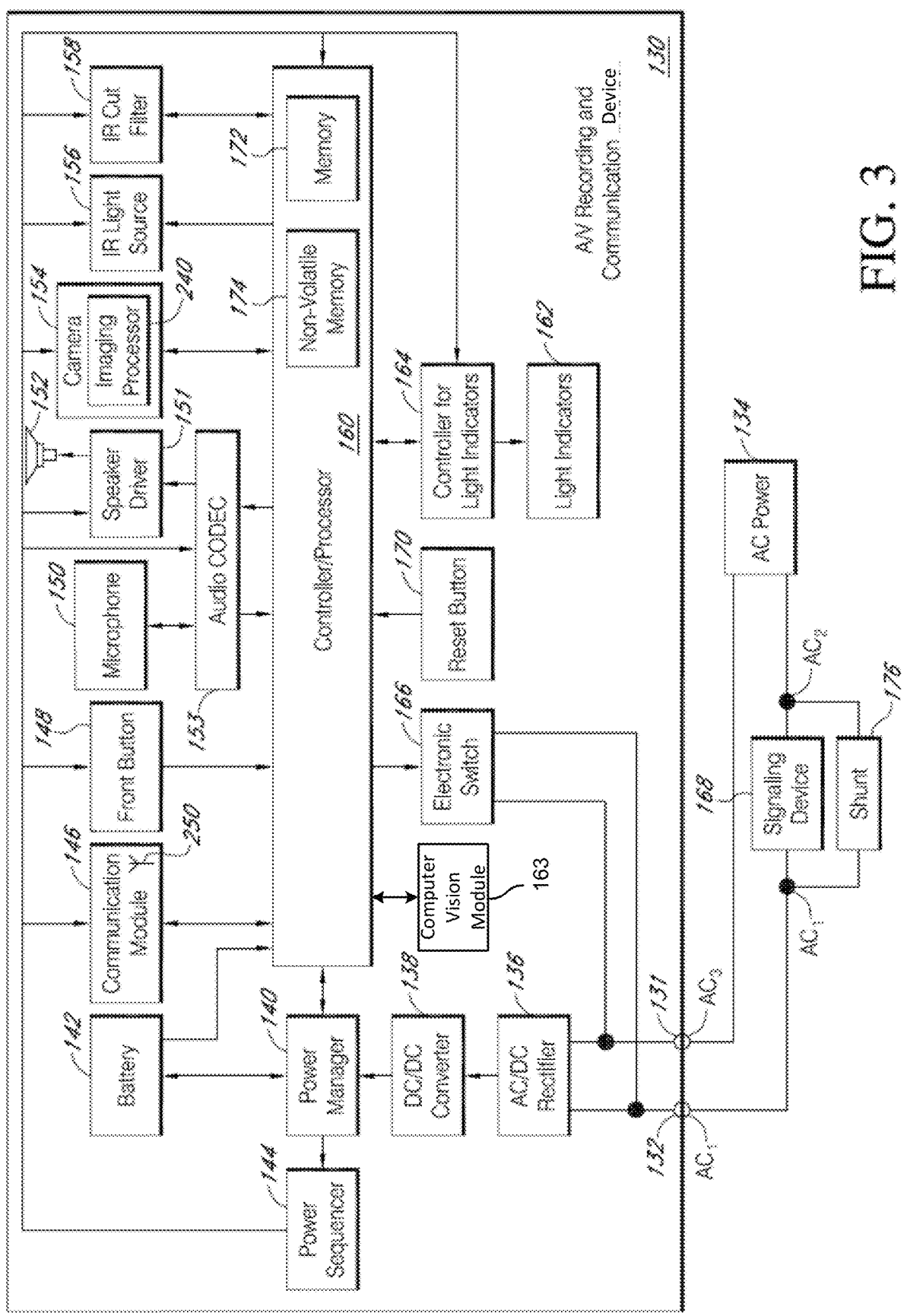
FIG. 3 is a functional block diagram illustrating an embodiment of an A/V recording and communication device according to the present disclosure.

FIGS. 3-13 illustrate one embodiment of a low-power-consumption A/V recording and communication device 130 according to various aspects of the present disclosure. FIG. 3 is a functional block diagram illustrating various components of the A/V recording and communication device 130 and their relationships to one another. For example, the A/V recording and communication device 130 includes a pair of terminals 131, 132 configured to be connected to a source of external AC (alternating-current) power, such as a household AC power supply 134 (may also be referred to as AC mains). The AC power 134 may have a voltage in the range of 16-24 V AC, for example. The incoming AC power 134 may be converted to DC (direct-current) by an AC/DC rectifier 136. An output of the AC/DC rectifier 136 may be connected to an input of a DC/DC converter 138, which may step down the voltage from the output of the AC/DC rectifier 136 from 16-24 VDC to a lower voltage of about 5 VDC, for example. In various embodiments, the output of the DC/DC converter 138 may be in a range of from about 2.5 V to about 7.5 V, for example.

With further reference to FIG. 3, the output of the DC/DC converter 138 is connected to a power manager 140, which may comprise an integrated circuit including a processor core, memory, and/or programmable input/output peripherals. In one non-limiting example, the power manager 140 may be an off-the-shelf component, such as the BQ24773 chip manufactured by Texas Instruments. As described in detail below, the power manager 140 controls, among other things, an amount of power drawn from the external power supply 134, as well as an amount of supplemental power drawn from a battery 142, to power the A/V recording and communication device 130. The power manager 140 may, for example, limit the amount of power drawn from the external power supply 134 so that a threshold power draw is not exceeded. In one non-limiting example, the threshold power, as measured at the output of the DC/DC converter 138, may be equal to 1.4 A. The power manager 140 may also control an amount of power drawn from the external power supply 134 and directed to the battery 142 for recharging of the battery 142. An output of the power manager 140 is connected to a power sequencer 144, which controls a sequence of power delivery to other components of the A/V recording and communication device 130, including a communication module 146, a front button 148, a microphone 150, a speaker driver 151, a speaker 152, an audio CODEC (COder-DECoder) 153, a camera 154, an infrared (IR) light source 156, an IR cut filter 158, a processor 160 (may also be referred to as a controller 160), a plurality of light indicators 162, and a controller 164 for the light indicators 162. Each of these components is described in detail below. The power sequencer 144 may comprise an integrated circuit including a processor core, memory, and/or programmable input/output peripherals. In one non-limiting example, the power sequencer 144 may be an off-the-shelf component, such as the RT5024 chip manufactured by Richtek.

With further reference to FIG. 3, the A/V recording and communication device 130 further comprises an electronic switch 166 that closes when the front button 148 is depressed. When the electronic switch 166 closes, power from the AC power source 134 is diverted through a signaling device 168 that is external to the A/V recording and communication device 130 to cause the signaling device 168 to emit a sound, as further described below. In one non-limiting example, the electronic switch 166 may be a triac (triode AC switch) device. The A/V recording and communication device 130 further comprises a reset button 170 configured to initiate a hard reset of the processor 160, as further described below.

With further reference to FIG. 3, the processor 160 may perform data processing and various other functions, as described below. The processor 160 may comprise an integrated circuit including a processor core, memory 172, non-volatile memory 174, and/or programmable input/output peripherals (not shown). The memory 172 may comprise, for example, DDR3 (double data rate type three synchronous dynamic random-access memory). The non-volatile memory 174 may comprise, for example, NAND flash memory. In the embodiment illustrated in FIG. 3, the memory 172 and the non-volatile memory 174 are illustrated within the box representing the processor 160. It is to be understood that the embodiment illustrated in FIG. 3 is merely an example, and in some embodiments the memory 172 and/or the non-volatile memory 174 are not necessarily physically incorporated with the processor 160. The memory 172 and/or the non-volatile memory 174, regardless of their physical location, may be shared by one or more other components (in addition to the processor 160) of the present A/V recording and communication device 130.

The transfer of digital audio between the user and a visitor may be compressed and decompressed using the audio CODEC 153, which is operatively coupled to the processor 160. When the visitor speaks, audio from the visitor is compressed by the audio CODEC 153, digital audio data is sent through the communication module 146 to the network 112 via the user's network 110, routed by the server 118 and delivered to the user's client device 114. When the user speaks, after being transferred through the network 112, the user's network 110, and the communication module 146, the digital audio data is decompressed by the audio CODEC 153 and emitted to the visitor through the speaker 152, which is driven by the speaker driver 151.

With further reference to FIG. 3, some of the present embodiments may include a shunt 176 connected in parallel with the signaling device 168. The shunt 176 facilitates the ability of the A/V recording and communication device 130 to draw power from the AC power source 134 without inadvertently triggering the signaling device 168. The shunt 176, during normal standby operation, presents a relatively low electrical impedance, such as a few ohms, across the terminals of the signaling device 168. Most of the current drawn by the A/V recording and communication device 130, therefore, flows through the shunt 176, and not through the signaling device 168. The shunt 176, however, contains electronic circuitry (described below) that switches the shunt 176 between a state of low impedance, such as a few ohms, for example, and a state of high impedance, such as >1K ohms, for example. When the front button 148 of the A/V recording and communication device 130 is pressed, the electronic switch 166 closes, causing the voltage from the AC power source 134 to be impressed mostly across the shunt 176 and the signaling device 168 in parallel, while a small amount of voltage, such as about 1V, is impressed across the electronic switch 166. The circuitry in the shunt 176 senses this voltage, and switches the shunt 176 to the high impedance state, so that power from the AC power source 134 is diverted through the signaling device 168. The diverted AC power 134 is above the threshold necessary to cause the signaling device 168 to emit a sound. Pressing the front button 148 of the device 130 therefore causes the signaling device 168 to "ring," alerting any person(s) within the structure to which the device 130 is mounted that there is a visitor at the front door (or at another location corresponding to the location of the device 130). In one non-limiting example, the electronic switch 166 may be a triac device.

Figure 4:
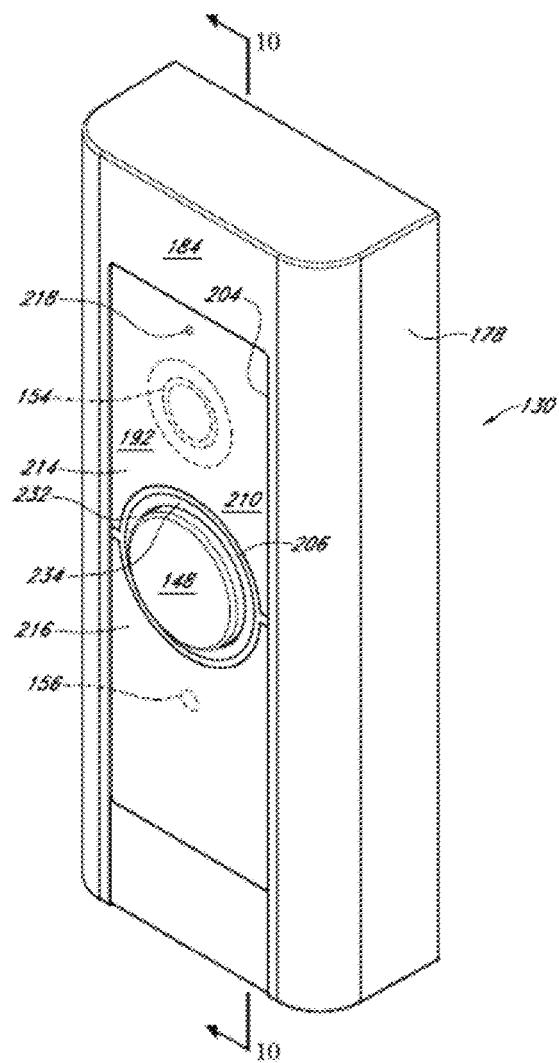
FIG. 4 is a front perspective view of an embodiment of an A/V recording and communication device according to the present disclosure.
Figure 5:
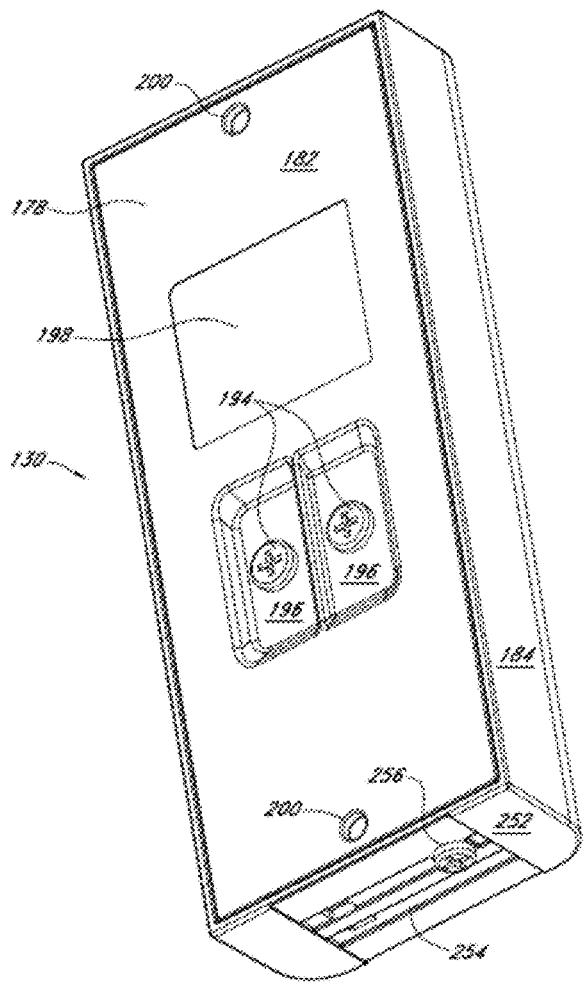
FIG. 5 is a rear perspective view of the A/V recording and communication device of FIG. 4.
Figure 6:
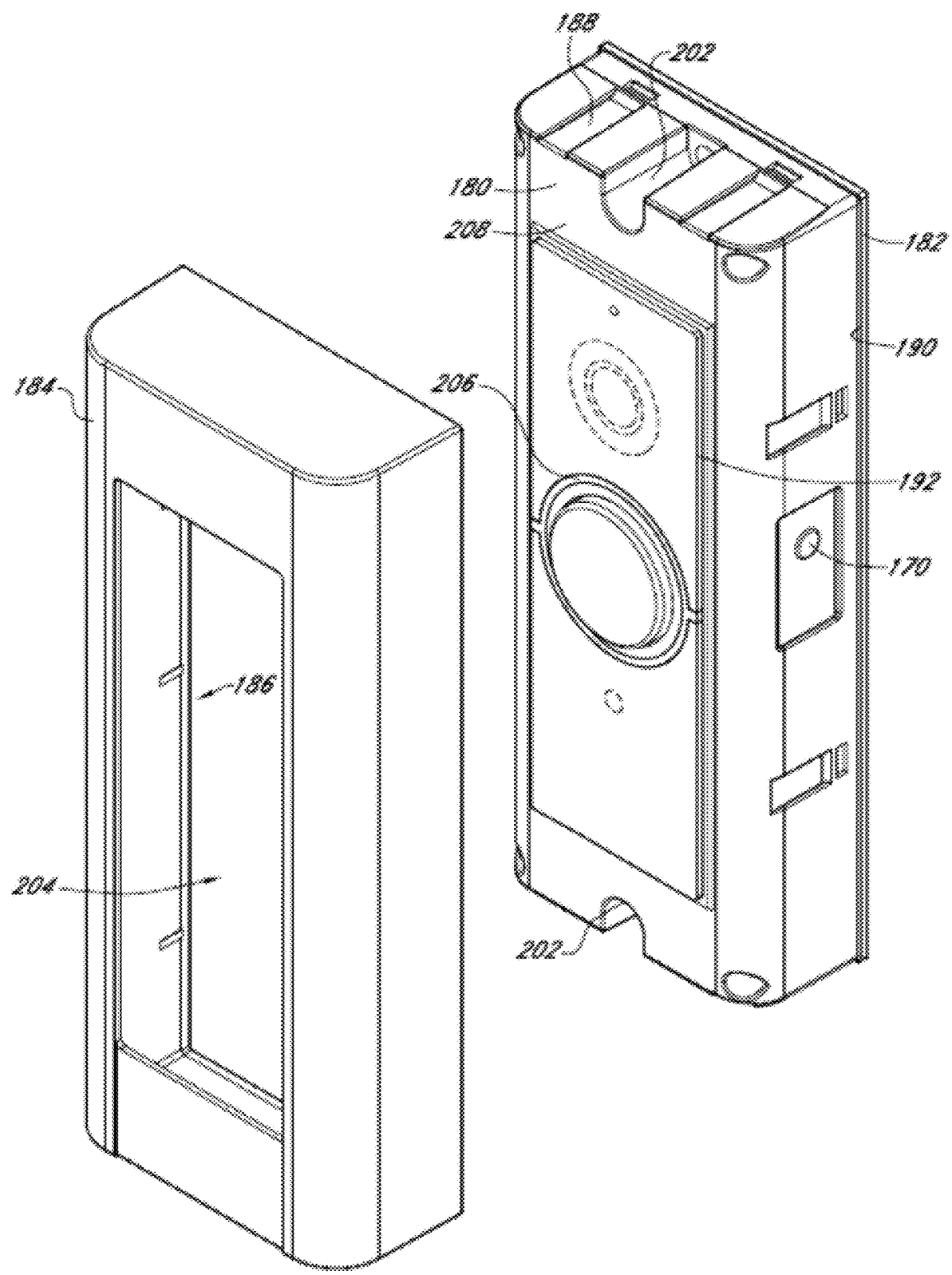
FIG. 6 is a partially exploded front perspective view of the A/V recording and communication device of FIG. 4 showing the cover removed.

With reference to FIGS. 4-6, the A/V recording and communication device 130 further comprises a housing 178 having an enclosure 180 (FIG. 6), a back plate 182 secured to the rear of the enclosure 180, and a shell 184 overlying the enclosure 180. With reference to FIG. 6, the shell 184 includes a recess 186 that is sized and shaped to receive the enclosure 180 in a close fitting engagement, such that outer surfaces of the enclosure 180 abut conforming inner surfaces of the shell 184. Exterior dimensions of the enclosure 180 may be closely matched with interior dimensions of the shell 184 such that friction maintains the shell 184 about the enclosure 180. Alternatively, or in addition, the enclosure 180 and/or the shell 184 may include mating features 188, such as one or more tabs, grooves, slots, posts, etc. to assist in maintaining the shell 184 about the enclosure 180. The back plate 182 is sized and shaped such that the edges of the back plate 182 extend outward from the edges of the enclosure 180, thereby creating a lip 190 against which the shell 184 abuts when the shell 184 is mated with the enclosure 180, as shown in FIGS. 4 and 5. In some embodiments, multiple shells 184 in different colors may be provided so that the end user may customize the appearance of his or her A/V recording and communication device 130. For example, the A/V recording and communication device 130 may be packaged and sold with multiple shells 184 in different colors in the same package.

With reference to FIG. 4, a front surface of the A/V recording and communication device 130 includes the button 148 (may also be referred to as front button 148, FIG. 3), which is operatively connected to the processor 160. In a process similar to that described above with reference to FIG. 2, when a visitor presses the front button 148, an alert may be sent to the user's client device to notify the user that someone is at his or her front door (or at another location corresponding to the location of the A/V recording and communication device 130). With further reference to FIG. 4, the A/V recording and communication device 130 further includes the camera 154, which is operatively connected to the processor 160, and which is located behind a shield 192. As described in detail below, the camera 154 is configured to capture video images from within its field of view. Those video images can be streamed to the user's client device and/or uploaded to a remote network device for later viewing according to a process similar to that described above with reference to FIG. 2.

With reference to FIG. 5, a pair of terminal screws 194 extends through the back plate 182. The terminal screws 194 are connected at their inner ends to the terminals 131, 132 (FIG. 3) within the A/V recording and communication device 130. The terminal screws 194 are configured to receive electrical wires to connect to the A/V recording and communication device 130, through the terminals 131, 132, to the household AC power supply 134 of the structure on which the A/V recording and communication device 130 is mounted. In the illustrated embodiment, the terminal screws 194 are located within a recessed portion 196 of the rear surface 198 of the back plate 182 so that the terminal screws 194 do not protrude from the outer envelope of the A/V recording and communication device 130. The A/V recording and communication device 130 can thus be mounted to a mounting surface with the rear surface 198 of the back plate 182 abutting the mounting surface. The back plate 182 includes apertures 200 adjacent its upper and lower edges to accommodate mounting hardware, such as screws (not shown), for securing the back plate 182 (and thus the A/V recording and communication device 130) to the mounting surface. With reference to FIG. 6, the enclosure 180 includes corresponding apertures 202 adjacent its upper and lower edges that align with the apertures 200 in the back plate 182 to accommodate the mounting hardware. In certain embodiments, the A/V recording and communication device 130 may include a mounting plate or bracket (not shown) to facilitate securing the A/V recording and communication device 130 to the mounting surface.

Figure 10:
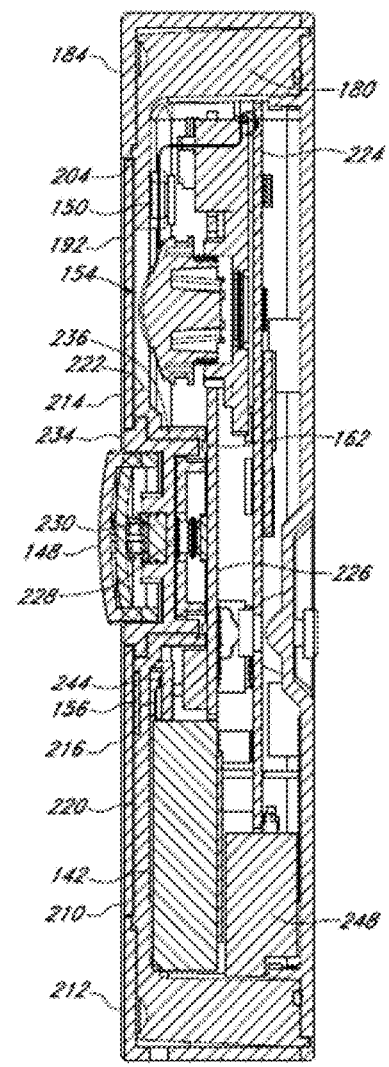
FIG. 10 is a right-side cross-sectional view of the A/V recording and communication device of FIG. 4 taken through the line 10-10 in FIG. 4.

With further reference to FIG. 6, the shell 184 includes a central opening 204 in a front surface. The central opening 204 is sized and shaped to accommodate the shield 192. In the illustrated embodiment, the shield 192 is substantially rectangular, and includes a central opening 206 through which the front button 148 protrudes. The shield 192 defines a plane parallel to and in front of a front surface 208 of the enclosure 180. When the shell 184 is mated with the enclosure 180, as shown in FIGS. 4 and 10, the shield 192 resides within the central opening 204 of the shell 184 such that a front surface 210 of the shield 192 is substantially flush with a front surface 212 of the shell 184 and there is little or no gap (FIG. 4) between the outer edges of the shield 192 and the inner edges of the central opening 204 in the shell 184.

With further reference to FIG. 6, the shield 192 includes an upper portion 214 (located above and to the sides of the front button 148) and a lower portion 216 (located below and to the sides of the front button 148). The upper and lower portions 214, 216 of the shield 192 may be separate pieces, and may comprise different materials. The upper portion 214 of the shield 192 may be transparent or translucent so that it does not interfere with the field of view of the camera 154. For example, in certain embodiments the upper portion 214 of the shield 192 may comprise glass or plastic. As described in detail below, the microphone 150, which is operatively connected to the processor 160, is located behind the upper portion 214 of the shield 192. The upper portion 214, therefore, may include an opening 218 that facilitates the passage of sound through the shield 192 so that the microphone 150 is better able to pick up sounds from the area around the A/V recording and communication device 130.

The lower portion 216 of the shield 192 may comprise a material that is substantially transparent to infrared (IR) light, but partially or mostly opaque with respect to light in the visible spectrum. For example, in certain embodiments the lower portion 216 of the shield 192 may comprise a plastic, such as polycarbonate. The lower portion 216 of the shield 192, therefore, does not interfere with transmission of IR light from the IR light source 156, which is located behind the lower portion 216. As described in detail below, the IR light source 156 and the IR cut filter 158, which are both operatively connected to the processor 160, facilitate "night vision" functionality of the camera 154.

The upper portion 214 and/or the lower portion 216 of the shield 192 may abut an underlying cover 220 (FIG. 10), which may be integral with the enclosure 180 or may be a separate piece. The cover 220, which may be opaque, may include a first opening 222 corresponding to the location of the camera 154, a second opening (not shown) corresponding to the location of the microphone 150 and the opening 218 in the upper portion 214 of the shield 192, and a third opening (not shown) corresponding to the location of the IR light source 156.

Figure 7:
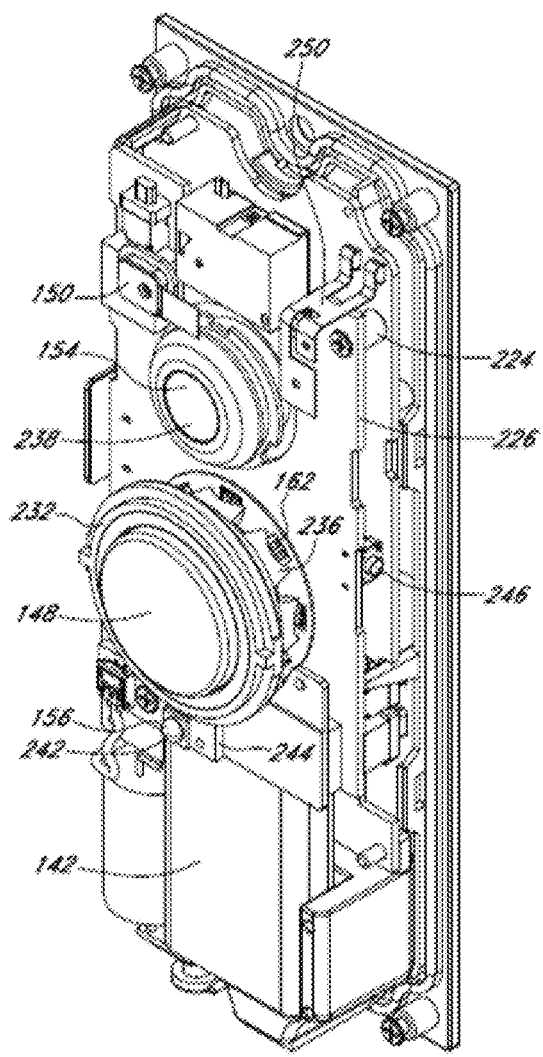
FIGS. 7-9 are front perspective views of various internal components of the A/V recording and communication device of FIG. 4.
Figure 8:
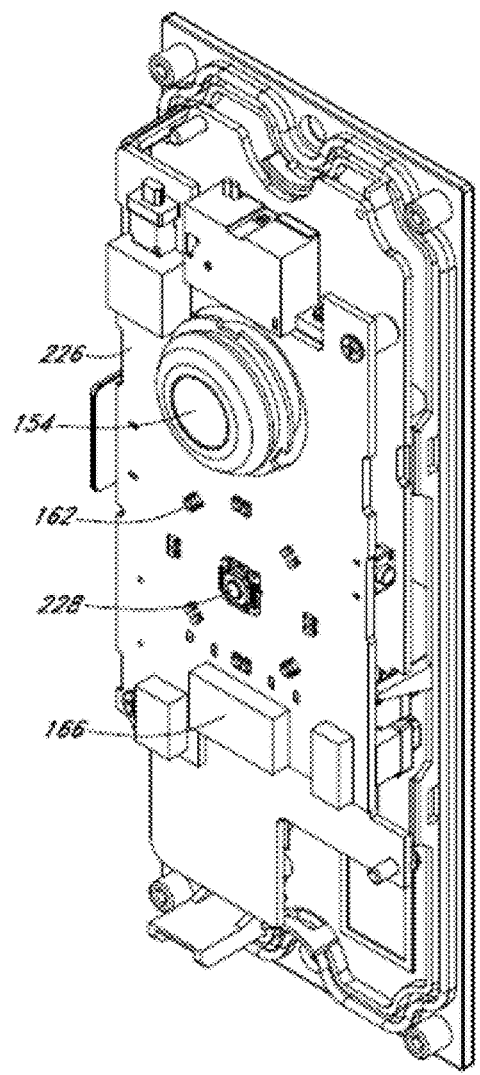
Figure 9:
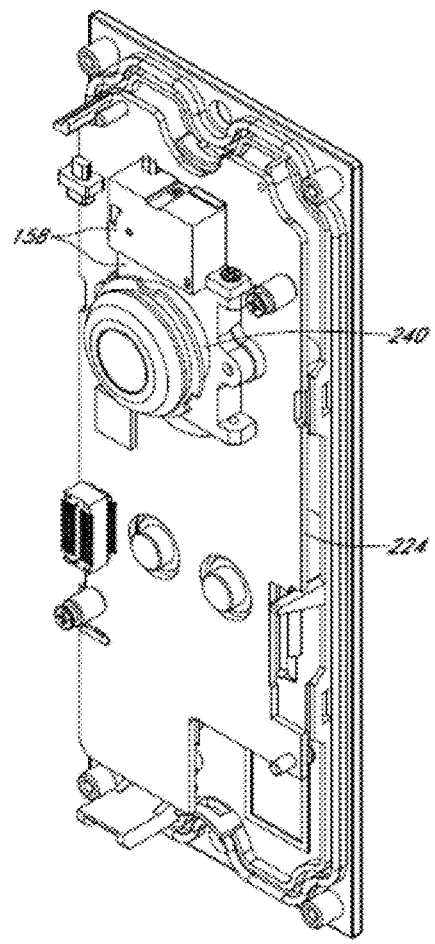

FIGS. 7-10 illustrate various internal components of the A/V recording and communication device 130. FIGS. 7-9 are front perspective views of the device 130 with the shell 184 and the enclosure 180 removed, while FIG. 10 is a right-side cross-sectional view of the device 130 taken through the line 10-10 in FIG. 4. With reference to FIGS. 7 and 8, the A/V recording and communication device 130 further comprises a main printed circuit board (PCB) 224 and a front PCB 226. With reference to FIG. 8, the front PCB 226 comprises a button actuator 228. With reference to FIGS. 7, 8, and 10, the front button 148 is located in front of the button actuator 228. The front button 148 includes a stem 230 (FIG. 10) that extends into the housing 178 to contact the button actuator 228. When the front button 148 is pressed, the stem 230 depresses the button actuator 228, thereby closing the electronic switch 166 (FIG. 8), as described below.

With reference to FIG. 8, the front PCB 226 further comprises the light indicators 162, which may illuminate when the front button 148 of the device 130 is pressed. In the illustrated embodiment, the light indicators 162 comprise light-emitting diodes (LEDs 162) that are surface mounted to the front surface of the front PCB 226 and are arranged in a circle around the button actuator 228. The present embodiments are not limited to the light indicators 162 being LEDs, and in alternative embodiments the light indicators 162 may comprise any other type of light-emitting device. The present embodiments are also not limited by the number of light indicators 162 shown in FIG. 8, nor by the pattern in which they are arranged.

With reference to FIG. 7, the device 130 further comprises a light pipe 232. The light pipe 232 is a transparent or translucent ring that encircles the front button 148. With reference to FIG. 4, the light pipe 232 resides in an annular space between the front button 148 and the central opening 206 in the shield 192, with a front surface 234 of the light pipe 232 being substantially flush with the front surface 210 of the shield 192. With reference to FIGS. 7 and 10, a rear portion of light pipe 232 includes a plurality of posts 236 whose positions correspond to the positions of the LEDs 162. When the LEDs 162 are illuminated, light is transmitted through the posts 236 and the body of the light pipe 232 so that the light is visible at the front surface 234 of the light pipe 232. The LEDs 162 and the light pipe 232 thus provide a ring of illumination around the front button 148. The light pipe 232 may comprise a plastic, for example, or any other suitable material capable of transmitting light.

The LEDs 162 and the light pipe 232 may function as visual indicators for a visitor and/or a user. For example, the LEDs 162 may illuminate upon activation or stay illuminated continuously. In one aspect, the LEDs 162 may change color to indicate that the front button 148 has been pressed. The LEDs 162 may also indicate that the battery 142 needs recharging, or that the battery 142 is currently being charged, or that charging of the battery 142 has been completed. The LEDs 162 may indicate that a connection to the user's wireless (and/or wired) network is good, limited, poor, or not connected. The LEDs 162 may be used to guide the user through setup or installation steps using visual cues, potentially coupled with audio cues emitted from the speaker 152.

With further reference to FIG. 7, the A/V recording and communication device 130 further comprises a rechargeable battery 142. As described in further detail below, the A/V recording and communication device 130 is connected to an external power source 134 (FIG. 3), such as AC mains. The A/V recording and communication device 130 is primarily powered by the external power source 134, but may also draw power from the rechargeable battery 142 so as not to exceed a threshold amount of power from the external power source 134, to thereby avoid inadvertently sounding the signaling device 168. With reference to FIG. 3, the battery 142 is operatively connected to the power manager 140. As described below, the power manager 140 controls an amount of power drawn from the battery 142 to supplement the power drawn from the external AC power source 134 to power the A/V recording and communication device 130 when supplemental power is needed. The power manager 140 also controls recharging of the battery 142 using power drawn from the external power source 134. The battery 142 may comprise, for example, a lithium-ion battery, or any other type of rechargeable battery.

With further reference to FIG. 7, the A/V recording and communication device 130 further comprises the camera 154. The camera 154 is coupled to a front surface of the front PCB 226, and includes a lens 238 and an imaging processor 240 (FIG. 9). The camera lens 238 may be a lens capable of focusing light into the camera 154 so that clear images may be captured. The camera 154 may comprise, for example, a high definition (HD) video camera, such as one capable of capturing video images at an image display resolution of 720p or better. In certain of the present embodiments, the camera 154 may be used to detect motion within its field of view, as described below.

With further reference to FIG. 7, the A/V recording and communication device 130 further comprises an infrared (IR) light source 242. In the illustrated embodiment, the IR light source 242 comprises an IR light-emitting diode (LED) 242 coupled to an IR LED printed circuit board (PCB) 244. In alternative embodiments, the IR LED 242 may not comprise a separate PCB 244, and may, for example, be coupled to the front PCB 226.

With reference to FIGS. 7 and 10, the IR LED PCB 244 is located below the front button 148 (FIG. 7) and behind the lower portion 216 of the shield 192 (FIG. 10). As described above, the lower portion 216 of the shield 192 is transparent to IR light, but may be opaque with respect to light in the visible spectrum. In alternative embodiments of the IR LED PCB 244, the IR LED PCB 244 may include more than one IR LED 242. For example, the IR LED PCB 244 may include three IR LEDs 242, or any other number of IR LEDs 242. In embodiments including more than one IR LED 242, the size of the third opening in the cover may be increased to accommodate the larger size of the IR LED PCB 244.

The IR LED 242 may be triggered to activate when a low level of ambient light is detected. When activated, IR light emitted from the IR LED 242 illuminates the camera 154's field of view. The camera 154, which may be configured to detect IR light, may then capture the IR light emitted by the IR LED 242 as it reflects off objects within the camera 154's field of view, so that the A/V recording and communication device 130 can clearly capture images at night (may be referred to as "night vision").

With reference to FIG. 9, the A/V recording and communication device 130 further comprises an IR cut filter 158. The IR cut filter 158 is a mechanical shutter that can be selectively positioned between the lens 238 and the image sensor of the camera 154. During daylight hours, or whenever there is a sufficient amount of ambient light, the IR cut filter 158 is positioned between the lens 238 and the image sensor to filter out IR light so that it does not distort the colors of images as the human eye sees them. During nighttime hours, or whenever there is little to no ambient light, the IR cut filter 158 is withdrawn from the space between the lens 238 and the image sensor, so that the camera 154 is sensitive to IR light ("night vision"). In some embodiments, the camera 154 acts as a light detector for use in controlling the current state of the IR cut filter 158 and turning the IR LED 242 on and off. Using the camera 154 as a light detector is facilitated in some embodiments by the fact that the A/V recording and communication device 130 is powered by a connection to AC mains, and the camera 154, therefore, is always powered on. In other embodiments, however, the A/V recording and communication device 130 may include a light sensor separate from the camera 154 for use in controlling the IR cut filter 158 and the IR LED 242.

With reference back to FIG. 6, the A/V recording and communication device 130 further comprises a reset button 170. The reset button 170 contacts a reset button actuator 246 (FIG. 8) coupled to the front PCB 226. When the reset button 170 is pressed, it may contact the reset button actuator 246, which may trigger the erasing of any data stored at the non-volatile memory 174 and/or at the memory 172 (FIG. 3), and/or may trigger a reboot of the processor 160. In some embodiments, the reset button 170 may also be used in a process to activate the A/V recording and communication device 130, as described below.

Figure 11:
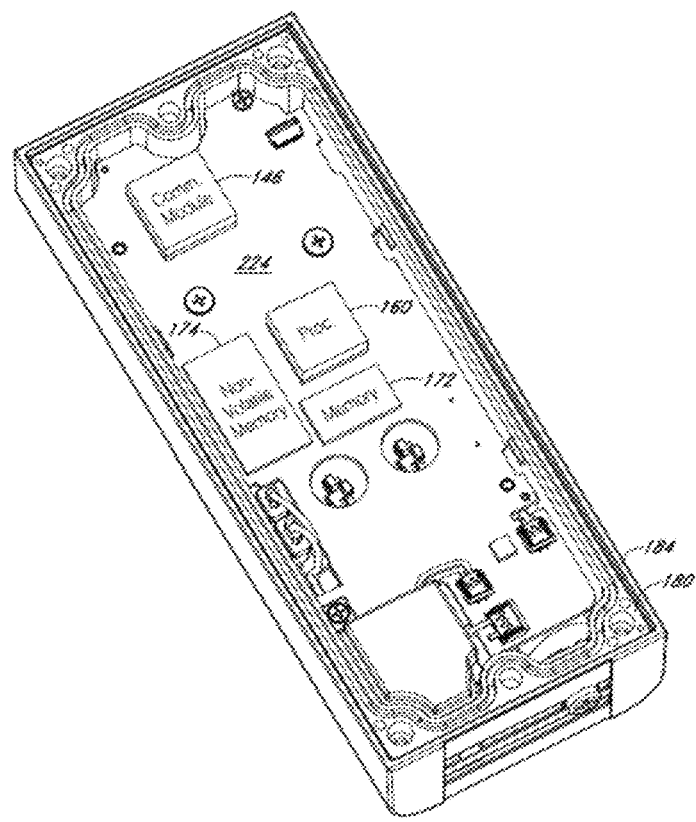
FIGS. 11-13 are rear perspective views of various internal components of the A/V recording and communication device of FIG. 4.
Figure 12:
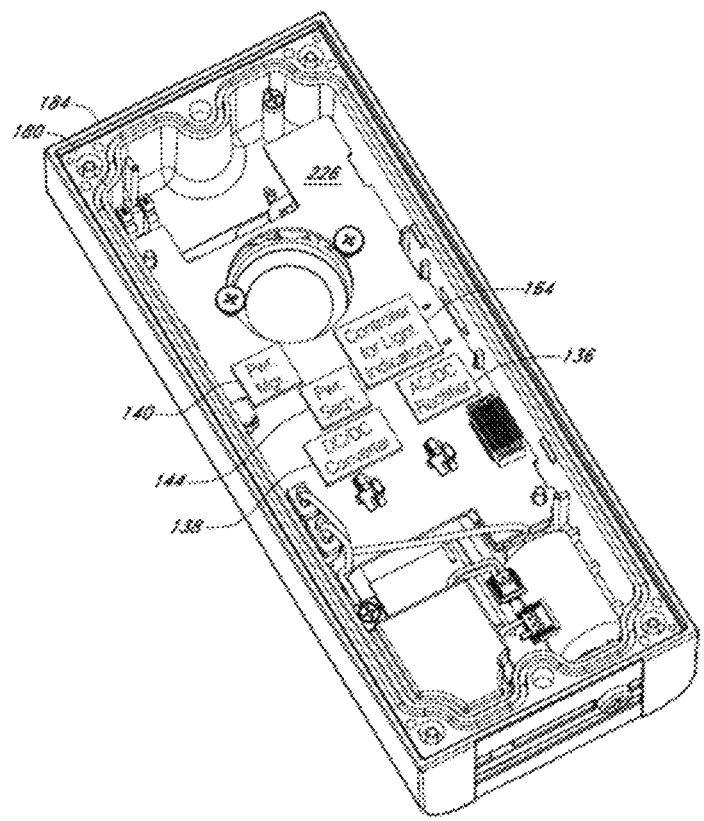
Figure 13:
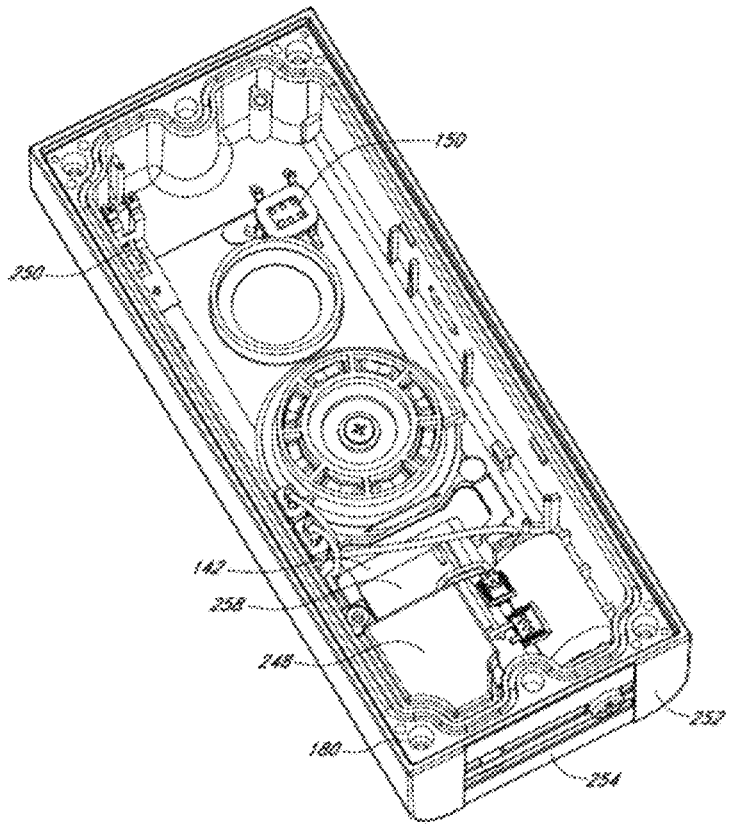

FIGS. 11-13 further illustrate internal components of the A/V recording and communication device 130. FIGS. 11-13 are rear perspective views of the device 130 with the back plate 182 and additional components removed. For example, in FIG. 11 the back plate 182 is removed, while in FIG. 12 the back plate 182 and the main PCB 224 are removed, and in FIG. 13 the back plate 182, the main PCB 224, and the front PCB 226 are removed. With reference to FIG. 11, several components are coupled to the rear surface of the main PCB 224, including the communication module 146, the processor 160, memory 172, and non-volatile memory 174. The functions of each of these components are described below. With reference to FIG. 12, several components are coupled to the rear surface of the front PCB 226, including the power manager 140, the power sequencer 144, the AC/DC rectifier 136, the DC/DC converter 138, and the controller 164 for the light indicators 162. The functions of each of these components are also described below. With reference to FIG. 13, several components are visible within the enclosure 180, including the microphone 150, a speaker chamber 248 (in which the speaker 152 is located), and an antenna 250 for the communication module 146. The functions of each of these components are also described below.

With reference to FIG. 7, the antenna 250 is coupled to the front surface of the main PCB 224 and operatively connected to the communication module 146, which is coupled to the rear surface of the main PCB 224 (FIG. 11). The microphone 150, which may also be coupled to the front surface of the main PCB 224, is located near the opening 218 (FIG. 4) in the upper portion 214 of the shield 192 so that sounds emanating from the area around the A/V recording and communication device 130 can pass through the opening 218 and be detected by the microphone 150. With reference to FIG. 13, the speaker chamber 248 is located near the bottom of the enclosure 180. The speaker chamber 248 comprises a hollow enclosure in which the speaker 152 is located. The hollow speaker chamber 248 amplifies the sounds made by the speaker 152 so that they can be better heard by a visitor in the area near the A/V recording and communication device 130. With reference to FIGS. 5 and 13, the lower surface 252 of the shell 184 and the lower surface (not shown) of the enclosure 180 may include an acoustical opening 254 through which the sounds made by the speaker 152 can pass so that they can be better heard by a visitor in the area near the A/V recording and communication device 130. In the illustrated embodiment, the acoustical opening 254 is shaped generally as a rectangle having a length extending substantially across the lower surface 252 of the shell 184 (and also the enclosure 180). The illustrated shape is, however, just one example. With reference to FIG. 5, the lower surface 252 of the shell 184 may further include an opening 256 for receiving a security screw (not shown). The security screw may extend through the opening 256 and into a similarly located opening in the enclosure 180 to secure the shell 184 to the enclosure 180. If the device 130 is mounted to a mounting bracket (not shown), the security screw may also maintain the device 130 on the mounting bracket.

With reference to FIG. 13, the A/V recording and communication device 130 may further include a battery heater 258. The present A/V recording and communication device 130 is configured for outdoor use, including in cold climates. Cold temperatures, however, can cause negative performance issues for rechargeable batteries, such as reduced energy capacity, increased internal resistance, reduced ability to charge without damage, and reduced ability to supply load current. The battery heater 258 helps to keep the rechargeable battery 142 warm in order to reduce or eliminate the foregoing negative performance issues. In the illustrated embodiment, the battery heater 258 comprises a substantially flat, thin sheet abutting a side surface of the rechargeable battery 142. The battery heater 258 may comprise, for example, an electrically resistive heating element that produces heat when electrical current is passed through it. The battery heater 258 may thus be operatively coupled to the power manager 140 and/or the power sequencer 144 (FIG. 12). In some embodiments, the rechargeable battery 142 may include a thermally sensitive resistor ("thermistor," not shown) operatively connected to the processor 160 so that the battery 142's temperature can be monitored and the amount of power supplied to the battery heater 258 can be adaptively controlled to keep the rechargeable battery 142 within a desired temperature range.

As discussed above, the present disclosure provides numerous examples of methods and systems including A/V recording and communication doorbells, but the present embodiments are equally applicable for A/V recording and communication devices other than doorbells. For example, the present embodiments may include one or more A/V recording and communication security cameras instead of, or in addition to, one or more A/V recording and communication doorbells. An example A/V recording and communication security camera may include substantially all of the structure and functionality of the device 130, but without the front button 148, the button actuator 228, and/or the light pipe 232.

The present disclosure also provides numerous examples of methods and systems including A/V recording and communication devices that are powered by a connection to AC mains, but the present embodiments are equally applicable for A/V recording and communication devices that are battery powered. For example, the present embodiments may include an A/V recording and communication device such as those described in US Patent Application Publication Nos. 2015/0022620 (application Ser. No. 14/499,828) and 2015/0022618 (application Ser. No. 14/334,922), both of which are incorporated herein by reference in their entireties as if fully set forth.

As discussed above, parcel theft is an increasingly common problem. Parcel carriers frequently leave parcels near the front door of a home when no one answers the door at the time of delivery. These parcels are vulnerable to theft, as they are often clearly visible from the street. This problem has only gotten worse with the proliferation of online commerce, and is particularly common around major holidays when many consumers do their holiday shopping online. It would be advantageous, therefore, if the functionality of A/V recording and communication devices could be leveraged to deter parcel theft and/or to identify and apprehend parcel thieves. It would also be advantageous if the functionality of A/V recording and communication devices could be enhanced in one or more ways to deter parcel theft and/or to identify and apprehend parcel thieves. The present embodiments provide these advantages and enhancements, as described below.

For example, some of the present embodiments deter parcel theft and/or facilitate the identification and apprehension of parcel thieves by determining that a parcel has been delivered, determining that the parcel has been removed from the delivery area, determining whether removal of the parcel was authorized, and, taking responsive action when the removal of the parcel is determined to have been unauthorized, such as generating an alert. Further, because the present embodiments include A/V recording and communication devices, acts of parcel theft are recorded by the camera of the A/V recording and communication device. These images are useful in identifying and apprehending parcel thieves.

Some of the present embodiments comprise computer vision for one or more aspects, such as object recognition. Computer vision includes methods for acquiring, processing, analyzing, and understanding images and, in general, high-dimensional data from the real world in order to produce numerical or symbolic information, e.g. in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g. ASCII). 2D Code Reading—Reading of 2D codes such as data matrix and QR codes. Facial Recognition. Shape Recognition Technology (SRT)—Differentiating human beings (e.g. head and shoulder patterns) from objects.

Typical functions and components (e.g. hardware) found in many computer vision systems are described in the following paragraphs. The present embodiments may include at least some of these aspects. For example, with reference to FIG. 3, embodiments of the present AN recording and communication device 130 may include a computer vision module 163. The computer vision module 163 may include any of the components (e.g. hardware) and/or functionality described herein with respect to computer vision, including, without limitation, one or more cameras, sensors, and/or processors. In some embodiments, the microphone 150, the camera 154, and/or the imaging processor 240 may be components of the computer vision module 163.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present embodiments may include a vision processing unit (not shown separately, but may be a component of the computer vision module 163). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a many core DSP (digital signal processor). But, like video processing units, vision processing units may have a focus on low precision fixed point arithmetic for image processing.

Figure 14:
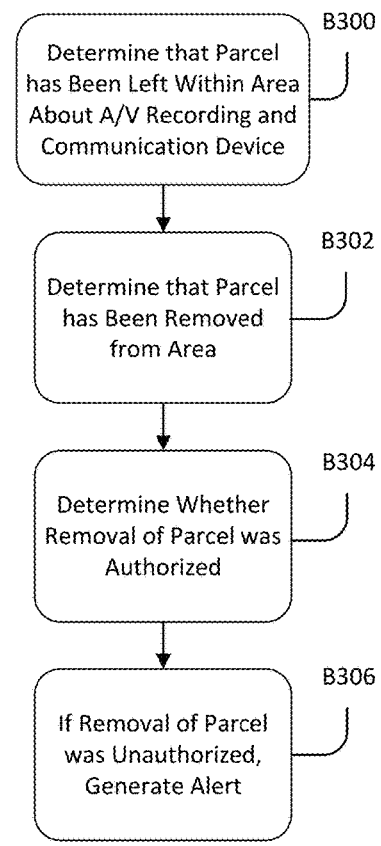
FIG. 14 is a flowchart illustrating an embodiment of a process for deterring parcel theft with an A/V recording and communication device according to various aspects of the present disclosure.

FIG. 14 illustrates an example embodiment of a process for deterring parcel theft with an A/V recording and communication device according to various aspects of the present disclosure. At block B300, the process determines that a parcel has been left within an area about an A/V recording and communication device, such as the A/V recording and communication device 130 described above. The present embodiments encompass any method of determining that a parcel has been left within an area about an A/V recording and communication device, and several examples are provided below. The present embodiments are not, however, limited to these examples, which are provided for illustration only. Any of the examples described below, as well as any of the present embodiments, may include one or more aspects of computer vision.

In one example embodiment, determining that the parcel has been left within the area about the A/V recording and communication device 130 may comprise comparing video frames recorded by the camera 154 of the A/V recording and communication device 130, e.g. using computer vision. For example, before a parcel is left within the area about the A/V recording and communication device 130, the field of view of the camera 154 may remain largely static. Different objects may occasionally (or frequently) pass through the camera's field of view, such as people, animals, cars, etc., but these objects generally do not remain within the camera's field of view for very long (on the order of seconds) and, if they stop within the camera's field of view, they typically begin moving again soon after stopping. By contrast, when a parcel is left within the camera's field of view, it typically remains within the camera's field of view for a significant amount of time (on the order of minutes or hours), and the parcel typically remains motionless throughout the time that it remains within the camera's field of view (at least until someone picks it up and carries it away). Thus, comparing video frames from a time before a parcel is left within the camera's field of view with video frames from a time after the parcel is left within the camera's field of view may enable a reliable determination to be made as to whether an object that is present within the camera's field of view is a parcel or not.

The present embodiments contemplate numerous methodologies for determining whether an object that is present within the camera's field of view is a parcel or not. Any or all of these methodologies may include one or more aspects of computer vision. For example, in some embodiments an object within the camera's field of view may be determined to be a parcel if the object is not present within the camera's field of view at a first time (in a first video frame), the object is present within the camera's field of view at a second time after the first time (in a second video frame), and the object remains within the camera's field of view for at least a threshold amount of time. Determining whether the object remains within the camera's field of view for at least the threshold amount of time may comprise review of one or more video frames that are recorded after the second video frame. In other embodiments, an object within the camera's field of view may be determined to be a parcel if the object is not present within the camera's field of view at a first time (in a first video frame), the object is present within the camera's field of view at a second time after the first time (in a second video frame), and the object remains motionless within the camera's field of view for at least a threshold amount of time. Determining whether the object remains motionless within the camera's field of view for at least the threshold amount of time may comprise review of one or more video frames that are recorded after the second video frame.

In other embodiments, an object within the camera's field of view may be determined to be a parcel if the object is not present within the camera's field of view at a first time (in a first video frame), a person is detected approaching the A/V recording and communication device 130 at a second time after the first time (in a second video frame), the person is detected moving away from the A/V recording and communication device 130 at a third time after the second time (in a third video frame), and the object is present within the camera's field of view at a fourth time after the third time (in a fourth video frame).

In other embodiments, an object within the camera's field of view may be determined to be a parcel if the object is not present within the camera's field of view at a first time (in a first video frame), a stationary vehicle (which may be a delivery vehicle, for example) is detected within the camera's field of view at a second time after the first time (in a second video frame), the object is present within the camera's field of view at a third time after the second time (in a third video frame), and the vehicle is no longer present within the camera's field of view at a fourth time after the third time (in a fourth video frame).

In other embodiments, an object within the camera's field of view may be determined to be a parcel if the object is not present within the camera's field of view at a first time (in a first video frame), the object is present within the camera's field of view at a second time after the first time (in a second video frame), and the object meets one or more criteria, such as having one or more physical characteristics. Examples of physical characteristics that may be examined to determine whether the object is a parcel include, without limitation, size, shape, color, and material (or materials). For example, if the object is made of cardboard and is brown or white (common colors for cardboard shipping boxes), it may be determined to be a parcel.

The present embodiments contemplate many processes for examining physical characteristics of the object and making a determination as to whether the object is a parcel. For example, some embodiments may comprise gathering information about the object using computer vision, and then comparing the gathered information about the object to stored information about parcels to determine whether there is a match. For example, the present embodiments may include a database of parcels and/or physical characteristics of parcels. The database may include pictures of known parcels, and comparing the gathered information about the object to the stored information about parcels may comprise comparing a picture of the object to the pictures of known parcels. Gathering information about the object using computer vision may comprise using one or more cameras, scanners, imagers, etc. and/or one or more sensors, such as sonar.

Figure 15:
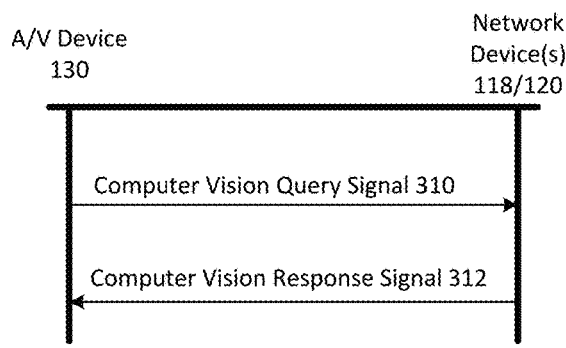
FIG. 15 is a sequence diagram illustrating an embodiment of a process for deterring parcel theft with an A/V recording and communication device according to various aspects of the present disclosure.

With reference to FIG. 15, information received by the computer vision module 163 of the A/V recording and communication device 130 may be sent to one or more network devices, such as the server 118 and/or the backend API 120, in a computer vision query signal 310. The one or more network devices may then analyze the sent information and/or compare the sent information with other information in one or more databases to determine whether there is a match, for example in order to identify the parcel. In one example embodiment, comparing the sent information about the parcel with other information in one or more databases to determine whether there is a match may comprise comparing the sent information, such as one or more photos or images, about the parcel with photos and/or images of known parcels. If there is a match, then one or more actions may occur, such as the A/V recording and communication device 130 transitioning to a different operational mode. For example, the network device, such as the server 118 and/or the backend API 120, may send a computer vision response signal 312 to the A/V recording and communication device 130. The computer vision response signal 312 may include a command to the A/V recording and communication device 130 to change the operational mode of the A/V recording and communication device 130. For example, the command to the A/V recording and communication device 130 may cause the A/V recording and communication device 130 to transition to an "armed" mode in which the A/V recording and communication device 130 is configured to take one or more actions when the parcel is removed from the area about the A/V recording and communication device 130, as described below.

In another example embodiment, determining that the parcel has been left within the area about the A/V recording and communication device 130 may comprise receiving information from a carrier (e.g. the postal service, FedEx, UPS, etc.) that delivered the parcel. For example, when the parcel carrier delivers the parcel, or at some time after the parcel carrier has delivered the parcel, the carrier may update a delivery status of the parcel in the carrier's parcel tracking system to indicate that the parcel has been delivered. The carrier's parcel tracking system may then forward that information to one or more network devices, such as the server 118 and/or the backend API 120, which may then forward the information to the A/V recording and communication device 130.

In another example embodiment, determining that the parcel has been left within the area about the A/V recording and communication device 130 may comprise automatic identification and data capture (AIDC). For example, the parcel may include at least one of a barcode, a matrix code, a bokode, and a radio frequency identification (RFID) tag. AIDC refers to methods of automatically identifying objects, collecting data about them, and entering that data directly into computer systems (e.g. without human involvement). Technologies typically considered part of AIDC include barcodes, matrix codes, bokodes, RFID, biometrics (e.g. iris recognition, facial recognition, voice recognition, etc.), magnetic stripes, Optical Character Recognition (OCR), and smart cards. AIDC is also commonly referred to as "Automatic Identification," "Auto-ID," and "Automatic Data Capture."

Figure 16:
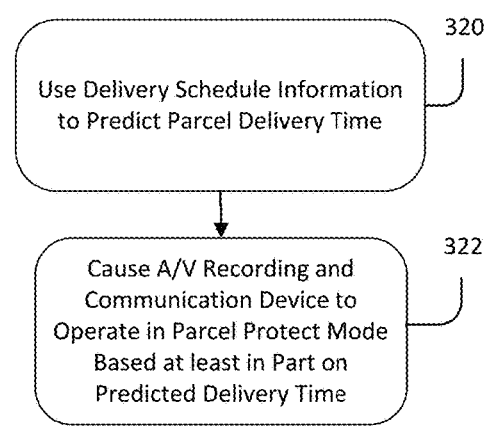
FIG. 16 is a flowchart illustrating a process for operating an A/V recording and communication device in a parcel protect mode based on a predicted parcel delivery time according to various aspects of the present disclosure.

FIG. 16 is a flowchart illustrating a process for operating an A/V recording and communication device in a parcel protect mode based on a predicted parcel delivery time according to various aspects of the present disclosure. In various embodiments, the process of FIG. 16 may be performed by a backend device, such as a server or other backend computer, such as the server 118 of FIG. 1. In the example shown, at block 320, delivery schedule information is used to predict parcel delivery time. For example, an e-commerce retailer or store (e.g., Amazon), or any other shipper, and/or a shipping service, such as a parcel delivery service (e.g., USPS, UPS, FedEx), may provide schedule information for routes to be delivered in an upcoming period, such as the present day or the next day. The schedule information may be communicated in electronic form via a machine-to-machine communication, such as by a software module running on a server of the parcel delivery service sending the information via one or more API calls to the backend API 120. In some embodiments, the delivery schedule information received at block 320 may include for each delivery location estimated delivery times estimated by the delivery service provider.

In some embodiments, the delivery schedule information may be limited to addresses associated with a recipient of the delivery schedule information. For example, a service provider of home access and/or home monitoring services associated with an installed base of A/V recording and communication devices may receive parcel delivery information from each of one or more parcel delivery service providers, and/or others, such as retailers, other shippers, and/or aggregators of delivery schedule information, but only for deliveries to locations associated with that service provider of home access and/or home monitoring services. For example, the provider of the information may select and/or filter delivery schedule information to provide only information associated with locations associated with A/V recording and communication devices monitored by the A/V recording and communication device monitoring service to which the parcel delivery schedule information is being sent. In some embodiments, the parcel delivery schedule information received by the A/V recording and communication device monitoring service provider may include locations not associated with any device monitored by that service provider, and the receiving service provider may filter the received parcel delivery schedule information to identify the portion of information relevant to the recipient.

In some embodiments, parcel delivery times may be predicted by processing parcel delivery route information to predict a time at which each respective parcel or group of parcels will be delivered at its destination location. In various embodiments, the parcel delivery service may provide a start time and an indication of a sequence in which the delivery driver will drive the route. Delivery times may be predicted and/or updated in real time based on information such as historically observed drive times and/or traffic patterns; historical data regarding actual delivery times along the same route; current traffic conditions along the route on the day of delivery; current weather conditions that may affect delivery times (e.g., rain, snow, visibility); historical data associated with the driver assigned to the route and which may be considered to be predictive of that driver's delivery times along the route in question; etc.

In some embodiments, predicted delivery times may be updated based on real-time information. For example, a delivery service provider may update estimated delivery times estimated by the delivery service provider. A delivery service provider may inform the recipient of delivery service information of a delay affecting a particular route, such as due to traffic, mechanical failure, and/or the driver being ahead of, or behind, the expected schedule. In some embodiments, real-time delivery information may include and/or be derived from actual delivery times of parcels along the route. For example, the driver may scan parcels as they are delivered, resulting in delivery schedule information and/or predicted delivery times (for parcels yet to be delivered along the route) being updated based on such actual delivery times of parcels that have been delivered.

Referring further to FIG. 16, at block 322, A/V recording and communication devices associated with locations at which one or more parcels are predicted to be delivered at a predicted delivery time are operated in a parcel protect mode as disclosed herein, based at least in part on the predicted delivery time. For example, a server performing the process of FIG. 16, such as the server 118 (FIG. 1), may schedule an A/V recording and communication device 100 to begin to operate in the parcel protect mode at a start time derived from the predicted delivery time associated with a location at which the A/V recording and communication device 100 is located. In some embodiments, the A/V recording and communication device 100 may be operated in the parcel protect mode until a command is sent to the A/V recording and communication device 100 to cause it to no longer operate in the parcel protect mode, e.g., after an indication has been received that the parcel was received and removed by an authorized person. For example, a user associated with the location may send an indication via an application executing on the user's client device 114 that the parcel has been received and secured by the user. In another example, computer vision techniques as described herein may be used to determine via processing, e.g., at the server 118, that the parcel was removed by an authorized person, such as by recognizing that a person who removed the parcel was an authorized person (e.g., by facial recognition and/or other biometric techniques) and/or by determining that the parcel was removed from within the area about the A/V recording and communication device 100 but not carried away from the house or other location to which the parcel had been delivered.

Figure 17:
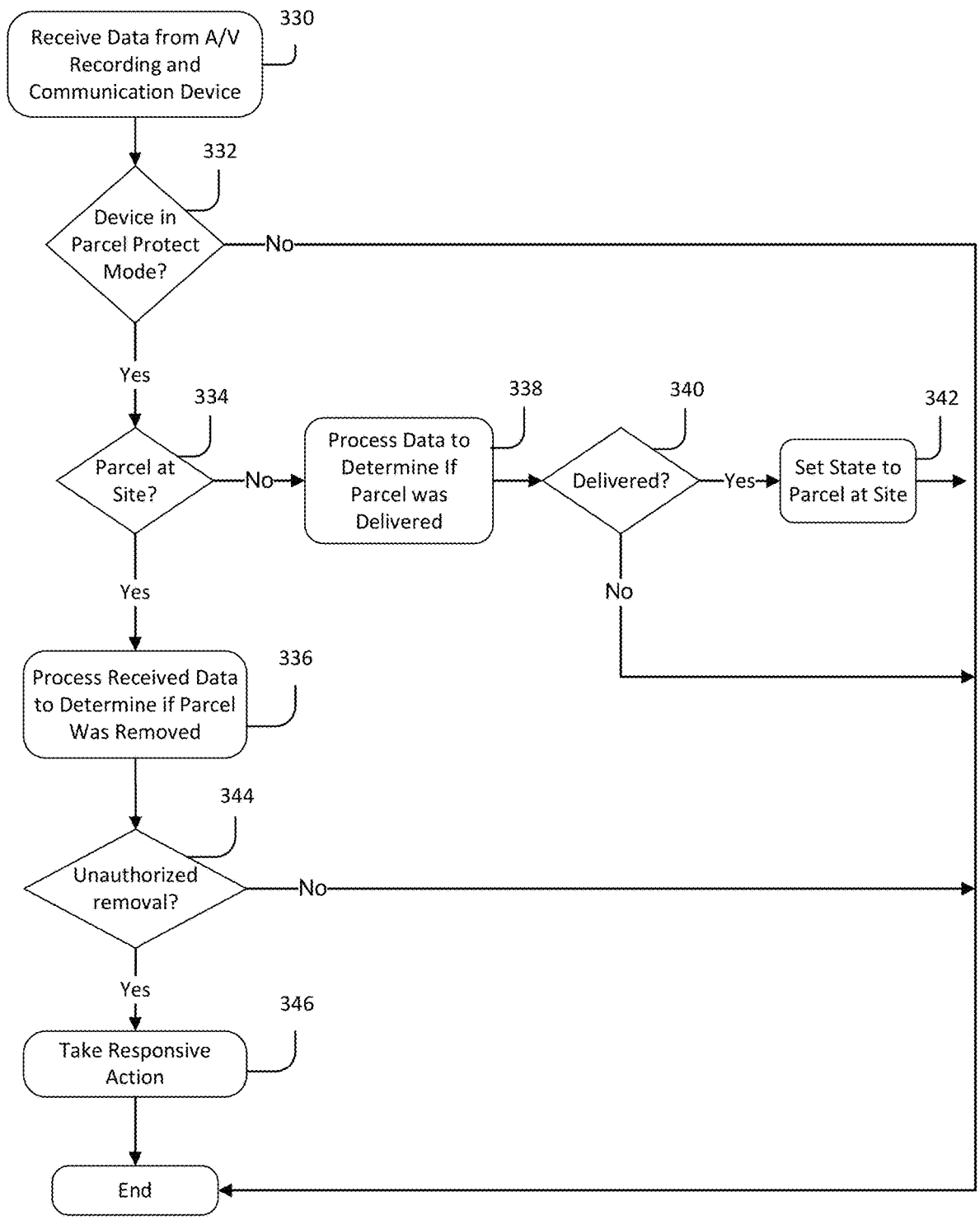
FIG. 17 is a flowchart illustrating a process for an A/V recording and communication device operating in a parcel protect mode according to various aspects of the present disclosure.

FIG. 17 is a flowchart illustrating a process for receiving data from an A/V recording and communication device operating in a parcel protect mode according to various aspects of the present disclosure. In various embodiments, the process of FIG. 17 may be performed by one or both of the server 118 and/or the backend API 120 of FIG. 1. In the example shown, at block 330 data is received from an A/V recording and communication device. The data may include one or more of a notification or alert, audio and/or video content data, data identifying a parcel (e.g., scanned or received by a sensor comprising the A/V recording and communication device), etc. At block 332, it is determined whether the A/V recording and communication device from which the data was received at block 330 is operating and/or being operated in a parcel protect mode. If not, the process of FIG. 17 ends. If, however, it is determined that the A/V recording and communication device from which the data was received at block 330 is operating and/or being operated in a parcel protect mode, it is determined at block 334 whether a parcel has been determined to be located at the location, e.g., based on information received previously from the A/V recording and communication device. If a parcel has not been determined to be at the location (e.g., has yet to be determined to have been delivered), at block 338 the data received at block 330 is processed to determine if the received data indicates a parcel has been delivered. If the data received at block 330 is determined to indicate a parcel has been delivered (block 340), at block 342 a state variable is set to indicate a parcel has been determined to have been delivered to the location, and the process of FIG. 17 ends. If the data received at block 330 is determined to not indicate that a parcel has been delivered (blocks 338, 340), the process of FIG. 17 ends.

If at block 334 it is determined that a parcel was determined previously to have been delivered to the site, at block 336 the data received at block 330 is processed to determine if the received data indicates the parcel was removed. If the parcel is determined at block 344 to have been removed, but the removal is determined to have been an authorized removal (e.g., authorized person recognized in video data and/or parcel carried into a house or other building at the location), the process of FIG. 17 ends. In some embodiments, state information may be updated to reflect authorized removal of the parcel and/or the associated A/V recording and communication device(s) may be taken out of parcel protect mode.

If unauthorized removal of the parcel is detected at block 344, responsive action is taken at block 346. Examples of responsive action may include, without limitation, one or more of sending an alert or notification to a user, e.g., via a user's client device 114; notifying authorities (e.g., police, private security, neighborhood watch); notifying the parcel delivery service; and taking action with respect to A/V recording and communication devices at one or more other locations, such as by recording and/or preserving A/V data from such other locations, placing A/V recording and communication devices at such other locations in parcel protect mode, and/or providing a list of such locations to the authorities. In some embodiments, the A/V recording and communication devices at one or more other locations may comprise A/V recording and communication devices at a same property or address, but located elsewhere on the same property or at the same address, as the first A/V recording and communication device.

In alternative embodiments, the process of FIG. 17 may be performed by the A/V recording and communication device itself. In such embodiments, block 330 may be omitted.

Figure 18:
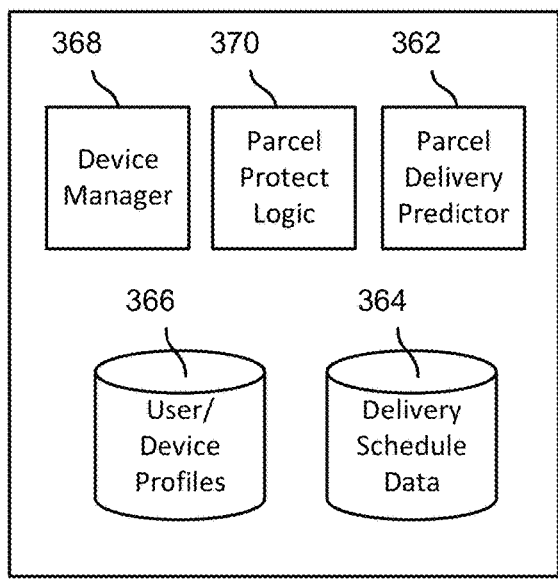
FIG. 18 is a functional block diagram illustrating a system to predict parcel delivery times and operate A/V recording and communication devices accordingly, according to various aspects of the present disclosure.

FIG. 18 is a functional block diagram illustrating a system 360 to predict parcel delivery times and operate A/V recording and communication devices accordingly, according to various aspects of the present disclosure. In various embodiments, the system of FIG. 18 may be implemented on and/or by one or more of the storage device 116, the server 118, and/or the backend API 120 of FIG. 1. In the example shown, the system 360 includes a parcel delivery predictor 362 configured to use parcel delivery schedule data stored in a data store 364 to predict parcel delivery times. In various embodiments, the parcel delivery predictor 362 may use location and other user and/or device profile data stored in a user/device profile data store 366 to predict parcel delivery times. A device manager 368 included in the system 360 may be configured to use predicted parcel delivery times stored in the data store 364 and user/device profiles stored in the data store 366 to cause A/V recording and communication devices that are managed by the system 360, and which are associated with parcels predicted to be delivered at a corresponding predicted parcel delivery time, to be placed and/or managed in a parcel protect mode, for example each at a time determined at least in part based on a predicted parcel delivery time of a parcel expected to be delivered at a location with which the A/V recording and communication device is associated.

The system 360 includes parcel protect logic 370. In various embodiments, the parcel protect logic 370 may process data received from A/V recording and communication devices operating in the parcel protect mode in a manner as disclosed herein. For example, in some embodiments, the parcel protect logic 370 may implement the process of FIG. 17.

In various embodiments, the system 360 may include one or more processors configured to implement one or more of the parcel delivery predictor 362, the device manager 368, and the parcel protect logic 370. For example, in some embodiments, one or more of the parcel delivery predictor 362, the device manager 368, and the parcel protect logic 370 may be implemented as software modules running on one or more processors comprising the system 360. In various embodiments, the system 360 may include one or more data storage devices, such as memory and/or internal or external disk drives or other storage devices, configured to store one or both of the delivery schedule data 364 and the user/device profiles 366.

Figure 19:
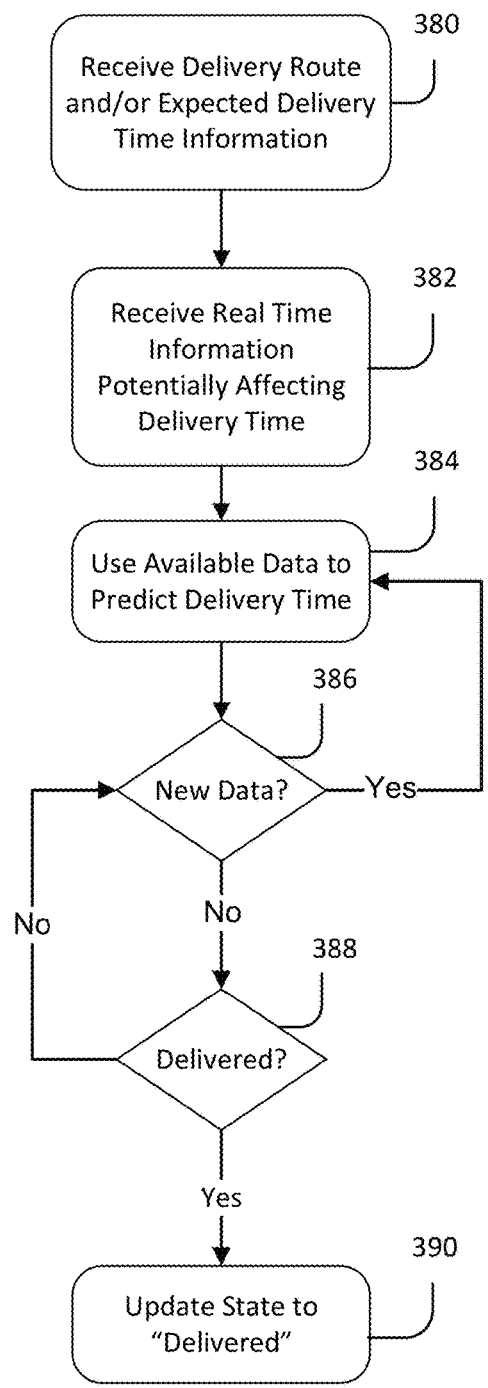
FIG. 19 is a flowchart illustrating a process for predicting parcel delivery time according to various aspects of the present disclosure.

FIG. 19 is a flowchart illustrating a process for predicting parcel delivery time according to various aspects of the present disclosure. In various embodiments, the process of FIG. 19 may be implemented by a software module or process, such as the parcel delivery predictor 362 running on the system 360 of FIG. 18. In the example shown, at block 380 delivery route and/or expected delivery time information is received, e.g., from a parcel delivery service provider (e.g., Amazon, USPS, UPS, FedEx). At block 382, real time information potentially affecting parcel delivery time(s) may be received. For example, traffic, delivery personnel or vehicle incident report data, weather data, etc. may be received. At block 384, available data is used to predict parcel delivery times. If new/updated information is received (block 386), predicted delivery times affected by the new information may be updated (block 384). Processing continues with respect to each parcel until it has been delivered (block 388), at which time the parcel status is updated to "delivered" at block 390.

Figure 20:
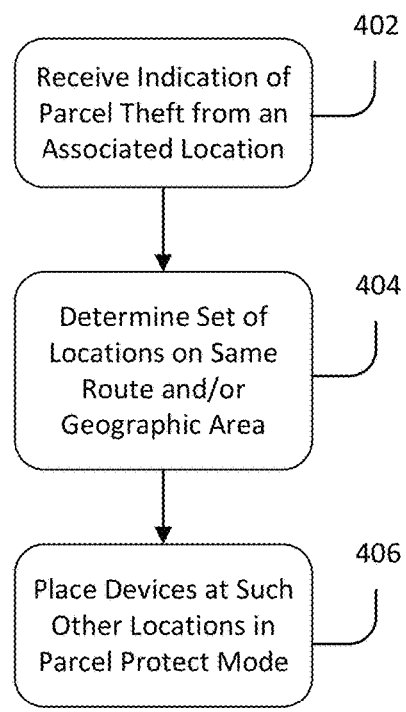
FIG. 20 is a flowchart illustrating a process for operating A/V recording and communication devices at one or more other locations in response to detection of parcel theft from a first location according to various aspects of the present disclosure.

FIG. 20 is a flowchart illustrating a process for operating A/V recording and communication devices at one or more other locations in response to detection of parcel theft from a first location according to various aspects of the present disclosure. In various embodiments, the process of FIG. 20 may be implemented by a backend server, such as the server 118 and/or the backend API 120 of FIG. 1. In some embodiments, the process of FIG. 20 may be implemented by one or more software modules, such as the device manager 368 and/or the parcel protect logic 370 of the system 360 of FIG. 18. In the example shown in FIG. 20, at block 402, an indication that a parcel has been removed without authorization (e.g., parcel theft) from an associated delivery location is received. For example, parcel theft may be detected as disclosed herein. At block 404, a set of locations on a same route and/or in the same geographic area as the parcel with respect to which parcel theft was detected is determined. For example, stops on the same delivery route as the parcel with respect to which parcel theft was detected may be included in the set. In some embodiments, stops on other delivery routes of the same parcel delivery service provider and/or delivery routes associated with other delivery services, may be included in the set, e.g., based on geographic area. At block 406, A/V recording and communication devices at locations included in the set are placed in a parcel protect mode, as disclosed herein, if not already in such a mode.

Figure 21:
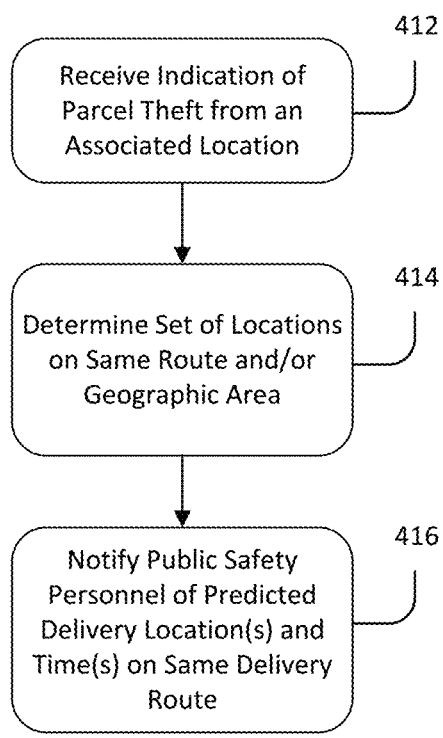
FIG. 21 is a flowchart illustrating a process for alerting authorities regarding a set of one or more locations in response to detection of parcel theft from a first location according to various aspects of the present disclosure.

FIG. 21 is a flowchart illustrating a process for alerting authorities regarding a set of one or more locations in response to detection of parcel theft from a first location according to various aspects of the present disclosure. In various embodiments, the process of FIG. 21 may be implemented by a backend server, such as the server 118 and/or the backend API 120 of FIG. 1. In some embodiments, the process of FIG. 21 may be implemented by one or more software modules, such as the device manager 368 and/or the parcel protect logic 370 of the system 360 of FIG. 18. In the example shown in FIG. 21, at block 412, an indication that a parcel has been removed without authorization (e.g., parcel theft) from an associated delivery location is received. For example, parcel theft may be detected as disclosed herein. At block 414, a set of locations on a same delivery route and/or in the same geographic area as the parcel with respect to which parcel theft was detected is determined. For example, stops on the same delivery route as the parcel with respect to which parcel theft was detected may be included in the set. In some embodiments, stops on other delivery routes of the same parcel delivery service provider and/or delivery routes associated with other delivery services, may be included in the set, e.g., based on geographic area. At block 416, public safety personnel, such as the police or other authorities, are notified of one or more of the detected parcel theft, a location associated with the detected parcel theft, and the delivery route and/or locations in the same area that were identified at block 414. In some embodiments, alerts may be sent to community members, e.g., through neighborhood social media, community email lists and/or bulletin boards, and/or community alert apps, services, etc., to alert residents of the detected parcel theft. In some embodiments, alerts may be sent to other users/owners of A/V recording and communication devices located near the location where the detected parcel theft occurred, for example through an application executing on client devices associated with those A/V recording and communication devices. Also in some embodiments, alerts may be sent to client devices associated with users who are not owners of A/V recording and communication devices, but who may nonetheless be interested in receiving such notifications, for example because of their geographic proximity to the location where the detected parcel theft occurred.

Figure 22:
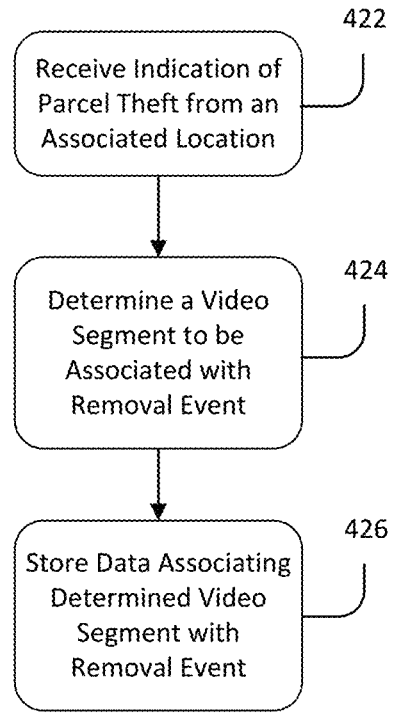
FIG. 22 is a flowchart illustrating a process for identifying a video segment based on detection of parcel theft from a location according to various aspects of the present disclosure.

FIG. 22 is a flowchart illustrating a process for identifying a video segment based on detection of parcel theft from a location according to various aspects of the present disclosure. In various embodiments, the process of FIG. 22 may be implemented by a backend server, such as the server 118 and/or the backend API 120 of FIG. 1. In some embodiments, the process of FIG. 22 may be implemented by one or more software modules, such as the device manager 368 and/or the parcel protect logic 370 of the system 360 of FIG. 18. In the example shown in FIG. 22, at block 422, an indication that a parcel has been removed without authorization (e.g., parcel theft) from an associated delivery location is received. For example, parcel theft may be detected as disclosed herein. At block 424, a video segment to be associated with the unauthorized parcel removal event is determined. For example, a video segment that begins with the person who removed the parcel approaching the area about the A/V recording and communication device at the location and ends after the person has left the field of view (e.g., drove away) is determined. At block 426, data that associates the determined video segment with the unauthorized parcel removal event is stored. In various embodiments, associating a video segment with such an event results in the segment being stored and/or preserved, e.g., in a cloud or other storage device such as device 116 of FIG. 1. In some embodiments, the determined video segment may be sent to the user/owner of the associated A/V recording and communication device and/or to local law enforcement.

Figure 23:
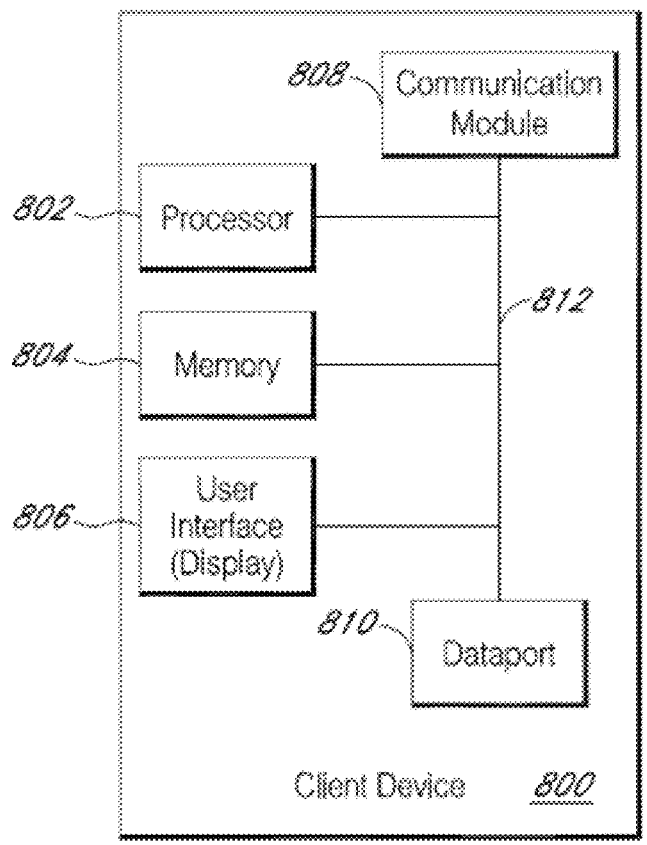
FIG. 23 is a functional block diagram of a client device on which the present embodiments may be implemented according to various aspects of the present disclosure.

FIG. 23 is a functional block diagram of a client device 800 on which the present embodiments may be implemented according to various aspects of the present disclosure. The user's client device 114 described with reference to FIG. 1 may include some or all of the components and/or functionality of the client device 800. The client device 800 may comprise, for example, a smartphone.

With reference to FIG. 23, the client device 800 includes a processor 802, a memory 804, a user interface 806, a communication module 808, and a dataport 810. These components are communicatively coupled together by an interconnect bus 812. The processor 802 may include any processor used in smartphones and/or portable computing devices, such as an ARM processor (a processor based on the RISC (reduced instruction set computer) architecture developed by Advanced RISC Machines (ARM).). In some embodiments, the processor 802 may include one or more other processors, such as one or more conventional microprocessors, and/or one or more supplementary co-processors, such as math co-processors.

The memory 804 may include both operating memory, such as random access memory (RAM), as well as data storage, such as read-only memory (ROM), hard drives, flash memory, or any other suitable memory/storage element. The memory 804 may include removable memory elements, such as a CompactFlash card, a MultiMediaCard (MMC), and/or a Secure Digital (SD) card. In some embodiments, the memory 804 may comprise a combination of magnetic, optical, and/or semiconductor memory, and may include, for example, RAM, ROM, flash drive, and/or a hard disk or drive. The processor 802 and the memory 804 each may be, for example, located entirely within a single device, or may be connected to each other by a communication medium, such as a USB port, a serial port cable, a coaxial cable, an Ethernet-type cable, a telephone line, a radio frequency transceiver, or other similar wireless or wired medium or combination of the foregoing. For example, the processor 802 may be connected to the memory 804 via the dataport 810.

The user interface 806 may include any user interface or presentation elements suitable for a smartphone and/or a portable computing device, such as a keypad, a display screen, a touchscreen, a microphone, and a speaker. The communication module 808 is configured to handle communication links between the client device 800 and other, external devices or receivers, and to route incoming/outgoing data appropriately. For example, inbound data from the dataport 810 may be routed through the communication module 808 before being directed to the processor 802, and outbound data from the processor 802 may be routed through the communication module 808 before being directed to the dataport 810. The communication module 808 may include one or more transceiver modules capable of transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, WiMAX, or any other protocol and/or technology.

The dataport 810 may be any type of connector used for physically interfacing with a smartphone and/or a portable computing device, such as a mini-USB port or an IPHONE®/IPOD® 30-pin connector or LIGHTNING® connector. In other embodiments, the dataport 810 may include multiple communication channels for simultaneous communication with, for example, other processors, servers, and/or client terminals.

The memory 804 may store instructions for communicating with other systems, such as a computer. The memory 804 may store, for example, a program (e.g., computer program code) adapted to direct the processor 802 in accordance with the present embodiments. The instructions also may include program elements, such as an operating system. While execution of sequences of instructions in the program causes the processor 802 to perform the process steps described herein, hard-wired circuitry may be used in place of, or in combination with, software/firmware instructions for implementation of the processes of the present embodiments. Thus, the present embodiments are not limited to any specific combination of hardware and software.

Figure 24:
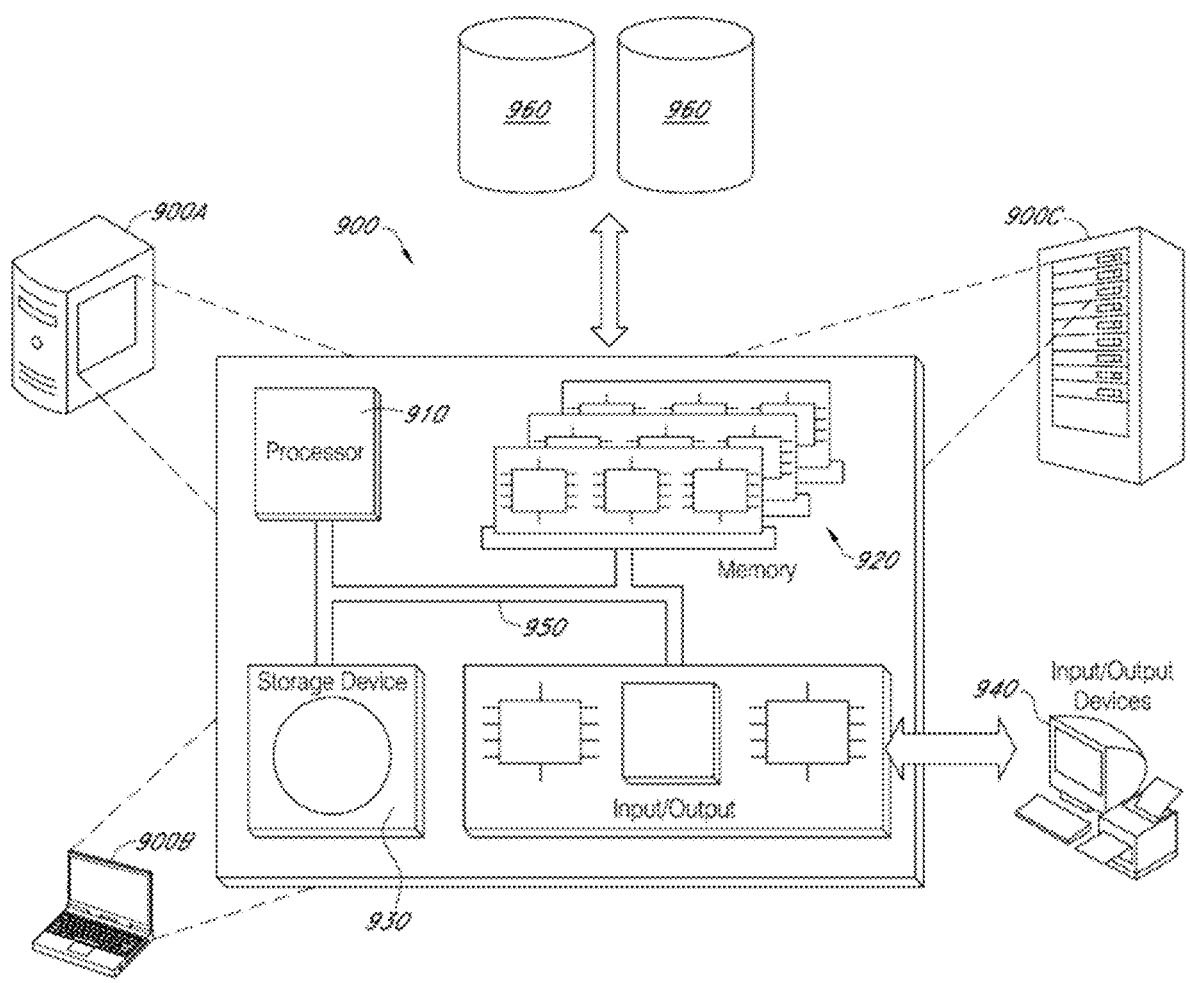
FIG. 24 is a functional block diagram of a general-purpose computing system on which the present embodiments may be implemented according to various aspects of the present disclosure.

FIG. 24 is a functional block diagram of a general-purpose computing system on which the present embodiments may be implemented according to various aspects of the present disclosure. The computer system 900 may be embodied in at least one of a personal computer (also referred to as a desktop computer) 900A, a portable computer (also referred to as a laptop or notebook computer) 900B, and/or a server 900C. A server is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 900 may execute at least some of the operations described above. The computer system 900 may include at least one processor 910, memory 920, at least one storage device 930, and input/output (I/O) devices 940. Some or all of the components 910, 920, 930, 940 may be interconnected via a system bus 950. The processor 910 may be single- or multi-threaded and may have one or more cores. The processor 910 may execute instructions, such as those stored in the memory 920 and/or in the storage device 930. Information may be received and output using one or more I/O devices 940.

The memory 920 may store information, and may be a computer-readable medium, such as volatile or non-volatile memory. The storage device(s) 930 may provide storage for the system 900, and may be a computer-readable medium. In various aspects, the storage device(s) 930 may be a flash memory device, a hard disk device, an optical disk device, a tape device, or any other type of storage device.

The I/O devices 940 may provide input/output operations for the system 900. The I/O devices 940 may include a keyboard, a pointing device, and/or a microphone. The I/O devices 940 may further include a display unit for displaying graphical user interfaces, a speaker, and/or a printer. External data may be stored in one or more accessible external databases 960.

The features of the present embodiments described herein may be implemented in digital electronic circuitry, and/or in computer hardware, firmware, software, and/or in combinations thereof. Features of the present embodiments may be implemented in a computer program product tangibly embodied in an information carrier, such as a machine-readable storage device, and/or in a propagated signal, for execution by a programmable processor. Embodiments of the present method steps may be performed by a programmable processor executing a program of instructions to perform functions of the described implementations by operating on input data and generating output.

The features of the present embodiments described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present embodiments may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present embodiments may be implemented in a computer system that includes a backend component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

In various embodiments, techniques as disclosed herein may provide a degree of protection against parcel theft and/or may aid in prevent further parcel theft and/or apprehending perpetrators of parcel theft.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   at least one processor;
   memory in electrical communication with the at least one processor, the memory storing:
      a plurality of image frames generated by a camera of an audio/video (A/V) device; and
      computer readable instructions that, when executed by the at least one processor, cause the system to:
         determine a first image frame and a second image frame of the plurality of image frames where an object is not detected in the first image frame, and the object is detected in the second image frame;
         determine a subsequent image frame, of the plurality of image frames and generated after a threshold amount of time after the second image frame, where the object detected in the subsequent image frame remains motionless as compared to the object detected in the second image frame; and
         in response to the determining the subsequent image frame, classify the object as a parcel.

2. The system of claim 1,
   the first image frame generated by the camera at a first time, and the second image frame generated by the camera at a second time;
   the memory storing further computer readable instructions that, when executed by the at least one processor, further cause the system to:
      determine that a third image frame of the plurality of image frames depicts a person approaching the A/V device, the third image frame generated by the camera at a third time, and
      determine that a fourth image frame the plurality of image frames depicts the person moving away from the A/V device, the fourth image frame generated by the camera at a fourth time,
      the third time being before the fourth time, and the third and fourth times being between the first and second times.

3. The system of claim 1,
   the first image frame generated by the camera at a first time, and the second image frame corresponding to a second time;
   the memory storing further computer readable instructions that, when executed by the at least one processor, further cause the system to:
      determine that a third image frame of the plurality of image frames depicts a stationary vehicle, the third image frame generated by the camera at a third time, and
      determine that a fourth image frame of the plurality of image frames does not depict the stationary vehicle, the fourth image frame image generated by the camera at a fourth time,
      the third time being between the first and second times, and the fourth time being after the second time.

4. The system of claim 1, the memory storing further computer readable instructions that, when executed by the at least one processor, further cause the system to:
   determine that the object has one or more physical characteristics.

5. The system of claim 4, the one or more physical characteristics including one or more of size, shape, color, and at least one material of the object.

6. The system of claim 1, the at least one processor and the memory being located within the A/V device.

7. The system of claim 1,
   the at least one processor and the memory being located within at least one device separate from the A/V device; and
   the memory storing further computer readable instructions that, when executed by the at least one processor, further cause the system to receive the plurality of image frames generated by the camera of the A/V device.

8. The system of claim 1, the memory storing further computer readable instructions that, when executed by the at least one processor, further cause the system to, after classifying the object as a parcel, generate a control signal indicating to change an operational mode of the A/V device from a first mode to a parcel protect mode.

9. A system, comprising:
   at least one processor;
   memory in electrical communication with the at least one processor, the memory storing:
      a plurality of image frames generated by a camera of an audio/video (A/V) device, and
      computer readable instructions that, when executed by the at least one processor, cause the system to:
         determine a first image frame of a plurality of image frames that depicts a person approaching the A/V device, the first image frame being generated by the camera at a first time,
         determine a second image frame of the plurality of image frames that depicts the person moving away from the A/V device, the second image frame generated by the camera at a second time after the first time,
         determine a subsequent image frame of the plurality of image frames that depicts a motionless object, the subsequent image frame generated by the camera after the first time; and
         classify the motionless object as a parcel.

10. The system of claim 9,
the memory storing further computer readable instructions that, when executed by the at least one processor, further cause the system to:
determine a preceding image frame of the plurality of image frames that depicts a stationary vehicle, the preceding image frame generated by the camera before the first time, and
determine an additional image frame of the plurality of image frames that does not depict the stationary vehicle, the additional image frame generated by the camera after the second time.

11. The system of claim 9, the at least one processor and the memory being located within the A/V device.

12. The system of claim 9,
the at least one processor and the memory being located within at least one device separate from the A/V recording and communication device; and
the memory storing further computer readable instructions that, when executed by the at least one processor, further cause the system to receive the plurality of image frames generated by the camera of the A/V device.

13. The system of claim 9, the memory storing further computer readable instructions that, when executed by the at least one processor, further cause the system to, after classifying the motionless object as a parcel, generate a control signal to change an operational mode of the A/V device from a first mode to a parcel protect mode.

14. A system, comprising:
at least one processor;
memory in electrical communication with the at least one processor, the memory storing:
a plurality of image frames generated by a camera of an audio/video (A/V) device, and
computer readable instructions that, when executed by the at least one processor, cause the system to:
determine a first image frame of the plurality of image frames that depicts a stationary vehicle, the first image frame generated by the camera at a first time,
determine a second image frame of the plurality of image frames that does not depict the stationary vehicle, the second image frame generated by the camera at a second time after the first time,
determine a subsequent image frame of the plurality of image frames that depicts a motionless object, the subsequent image frame generated by the camera after the first time; and
classify the motionless object as a parcel.

15. The system of claim 14, the at least one processor and the memory being located within the A/V device.

16. The system of claim 14,
the at least one processor and the memory being located within at least one device separate from the A/V device;
the memory storing further computer readable instructions that, when executed by the at least one processor, further cause the system to receive the plurality of image frames generated by the camera.

17. The system of claim 14, the memory storing further computer readable instructions that, when executed by the at least one processor, further cause the system to, after classifying the motionless object as a parcel, generate a control signal to change an operational mode of the A/V device from a first mode to a parcel protect mode.

* * * * *